(12) United States Patent
Hettenkofer et al.

(10) Patent No.: US 10,373,066 B2
(45) Date of Patent: Aug. 6, 2019

(54) SIMPLIFIED PRODUCT CONFIGURATION USING TABLE-BASED RULES, RULE CONFLICT RESOLUTION THROUGH VOTING, AND EFFICIENT MODEL COMPILATION

(71) Applicant: Model N, Inc., Redwood Shores, CA (US)

(72) Inventors: Manfred Hettenkofer, San Francisco, CA (US); Eric Burin des Roziers, Montpellier (FR); John Ellithorpe, Redwood Shores, CA (US)

(73) Assignee: Model N. Inc., San Mateo, CA (US)

( * ) Notice: Subject to any disclaimer, the term of this patent is extended or adjusted under 35 U.S.C. 154(b) by 296 days.

(21) Appl. No.: 14/069,362

(22) Filed: Oct. 31, 2013

(65) Prior Publication Data
US 2014/0180969 A1    Jun. 26, 2014

Related U.S. Application Data

(60) Provisional application No. 61/740,816, filed on Dec. 21, 2012.

(51) Int. Cl.
| | |
|---|---|
| *G06N 7/02* | (2006.01) |
| *G06N 7/04* | (2006.01) |
| *G06N 7/06* | (2006.01) |
| *G06N 7/08* | (2006.01) |
| *G06N 20/00* | (2019.01) |

(52) U.S. Cl.
CPC .................... *G06N 20/00* (2019.01)

(58) Field of Classification Search
CPC .......... G06N 5/04; G06N 5/02; G06N 99/005; G09B 7/04; G06F 9/4446
See application file for complete search history.

(56) References Cited

U.S. PATENT DOCUMENTS

| | | | |
|---|---|---|---|
| 5,515,269 | A | 5/1996 | Willis et al. |
| 5,515,524 | A | 5/1996 | Lynch et al. |
| 5,576,965 | A | 11/1996 | Akasaka et al. |
| 5,617,514 | A | 4/1997 | Dolby et al. |
| 5,630,025 | A | 5/1997 | Dolby et al. |
| 5,708,798 | A | 1/1998 | Lynch et al. |
| 6,002,854 | A | 12/1999 | Lynch et al. |
| 6,035,305 | A * | 3/2000 | Strevey .................. G06Q 10/06 |

(Continued)

OTHER PUBLICATIONS

International Search Report and Written Opinion, dated Apr. 28, 2014, PCT/US2013/077214 (15 pages).

(Continued)

*Primary Examiner* — Scott A. Waldron
*Assistant Examiner* — Ababacar Seck
(74) *Attorney, Agent, or Firm* — Patent Law Works LLP

(57) ABSTRACT

Various implementations for simplified product configuration using table-based rule editing, rule conflict resolution through voting, and efficient model compilation are described. In one example implementation, a rule definition table is provided for presentation to a user. One or inputs defining a rule for a model using the rule definition table are received. The rule is compiled into a compiled rule that is executable during evaluation of the model and the model is evaluated based on the compiled rule. Numerous additional implementations are also described.

17 Claims, 24 Drawing Sheets

(56) References Cited

U.S. PATENT DOCUMENTS

| | | |
|---|---|---|
| 6,115,547 A | 9/2000 | Ghatate et al. |
| 6,188,977 B1 | 2/2001 | Hirota |
| 6,219,659 B1 | 4/2001 | Kliorin |
| 6,233,493 B1 | 5/2001 | Cherneff et al. |
| 6,430,730 B1 | 8/2002 | Ghatate et al. |
| 6,856,980 B2 | 2/2005 | Feldman et al. |
| 6,854,524 B1 | 3/2005 | Shah et al. |
| 6,915,253 B1 | 7/2005 | Chapman |
| 7,043,407 B2 | 5/2006 | Lynch et al. |
| 7,200,583 B1 | 4/2007 | Shah et al. |
| 7,340,409 B1 | 3/2008 | Ulwick |
| 7,433,748 B2 | 10/2008 | Selway |
| 7,483,869 B2 | 1/2009 | Kumar |
| 7,949,738 B2 * | 5/2011 | Kumar .............. G06N 5/025 709/223 |
| 7,970,724 B1 * | 6/2011 | Hauser .............. G06N 5/025 706/47 |
| 8,160,990 B2 | 4/2012 | Varmaraja et al. |
| 8,682,773 B1 | 3/2014 | Murphy et al. |
| 8,943,003 B2 * | 1/2015 | Ardoint .............. G06F 15/18 706/12 |
| 2001/0025264 A1 | 9/2001 | Deaddio et al. |
| 2002/0035463 A1 | 3/2002 | Lynch et al. |
| 2002/0072956 A1 | 6/2002 | Willems et al. |
| 2002/0111891 A1 | 8/2002 | Hoffman et al. |
| 2002/0120917 A1 * | 8/2002 | Abrari .............. G06F 8/10 717/110 |
| 2002/0154114 A1 | 10/2002 | Christensen et al. |
| 2002/0169658 A1 | 11/2002 | Adler |
| 2002/0198856 A1 | 12/2002 | Feldman et al. |
| 2003/0018486 A1 | 1/2003 | Feldman et al. |
| 2003/0033240 A1 | 2/2003 | Balson et al. |
| 2003/0212584 A1 | 11/2003 | Flores |
| 2004/0078796 A1 | 4/2004 | Utsumi |
| 2004/0122747 A1 | 6/2004 | Jimenez et al. |
| 2004/0128117 A1 | 7/2004 | Crandall et al. |
| 2004/0181441 A1 | 9/2004 | Fung et al. |
| 2005/0090911 A1 | 4/2005 | Ingargiola et al. |
| 2005/0096950 A1 | 5/2005 | Caplan et al. |
| 2005/0182693 A1 | 8/2005 | Alivandi |
| 2005/0183025 A1 * | 8/2005 | Kumar .............. G06N 5/025 715/764 |
| 2005/0222996 A1 * | 10/2005 | Yalamanchi ...... G06F 17/30386 |
| 2005/0263594 A1 * | 12/2005 | Onischu .............. G06Q 30/08 235/386 |
| 2006/0069892 A1 * | 3/2006 | Nakanishi .............. G06F 11/1458 711/162 |
| 2006/0100829 A1 | 5/2006 | Lynch et al. |
| 2006/0129978 A1 * | 6/2006 | Abrari .............. G06F 8/10 717/110 |
| 2006/0167577 A1 | 7/2006 | Clark et al. |
| 2006/0168573 A1 | 7/2006 | Clark et al. |
| 2006/0282458 A1 * | 12/2006 | Tsyganskiy .............. G06F 8/72 |
| 2007/0094060 A1 | 4/2007 | Apps et al. |
| 2007/0213968 A1 | 9/2007 | Nakagawa et al. |
| 2008/0059273 A1 | 3/2008 | Miller |
| 2008/0163101 A1 | 7/2008 | Rimas-Ribikauskas et al. |
| 2008/0216148 A1 * | 9/2008 | Bienek .............. H04L 41/0893 726/1 |
| 2009/0006301 A1 | 1/2009 | Goetsch et al. |
| 2009/0248597 A1 | 10/2009 | Fickie et al. |
| 2009/0287617 A1 * | 11/2009 | Schmidt .............. G06Q 10/06 706/10 |
| 2010/0121795 A1 | 5/2010 | Colena et al. |
| 2010/0161360 A1 | 6/2010 | Clement et al. |
| 2010/0262443 A1 | 10/2010 | D'Albis et al. |
| 2011/0087689 A1 * | 4/2011 | Ziegler .............. G06Q 10/10 707/769 |
| 2011/0173050 A1 | 7/2011 | Heyns et al. |
| 2011/0191263 A1 | 8/2011 | Torre et al. |
| 2011/0252163 A1 * | 10/2011 | Villar .............. G06F 17/5027 710/16 |
| 2011/0301926 A1 | 12/2011 | Chussil |
| 2012/0005144 A1 * | 1/2012 | Cutler .............. G06N 5/025 706/47 |
| 2012/0166459 A1 | 6/2012 | Ritter et al. |
| 2012/0198368 A1 | 8/2012 | Bornheimer et al. |
| 2013/0110473 A1 | 5/2013 | Cantu |
| 2014/0032482 A1 | 1/2014 | Dulaney et al. |
| 2014/0096041 A1 | 4/2014 | Gowen et al. |

OTHER PUBLICATIONS

European Office Action for Application No. 14197988.0 dated Mar. 26, 2018, 8 pages.

* cited by examiner

*Creating a rule in a model*

Display Name: Example rule with multiple targets

Description:

Type: Must select – some products come with certain selection ▼

Used in Models  0

Save

Rule detail

IF options are selected as follows THEN options below will be added automatically — 1650

1656 1658

| OG: Computer Type ▼ | OG: OSMediaKitComponent ▼ | Option to be added automatically 1660 |
|---|---|---|
| PC 1662 | Server ▼ 1664 | (RAM Size) < than 8GB    Specify Quantity 1674 <br> (RAM Type) RDIMM    Specify Quantity 1666 <br> ▶ *Add an option* 1676 |

Add Option Group — 1654

Add a new row — 1680

Figure 16B

SIMPLIFIED PRODUCT CONFIGURATION USING TABLE-BASED RULES, RULE CONFLICT RESOLUTION THROUGH VOTING, AND EFFICIENT MODEL COMPILATION

CROSS-REFERENCE TO RELATED APPLICATIONS

This application claims the benefit under 35 U.S.C. § 119(e) of U.S. Provisional Application No. 61/740,816, titled "Nimbus Configurator Architecture" and filed on Dec. 21, 2012, the entire contents of which are incorporated herein by reference.

BACKGROUND

The present disclosure relates to product configuration.

Companies across a variety of industries routinely face the challenges of complex value chains, with end customers purchasing directly and through distribution partners, manufacturer reps, and contract manufacturers across multiple regions. This distributed sales process often makes it difficult for organizations to obtain accurate visibility into demand. In addition, complex pricing rules and a large number of special pricing deals can hinder quote turnaround time and pricing consistency. These factors can impact an organization's ability to convert quotes into orders quickly and efficiently, thereby resulting in lost sales.

In addition, providing quotes for complex products and services can be very challenging because it often requires consideration of numerous different options and rules. Due to this complexity, existing configuration systems are often inflexible, slow, and unable to easily accommodate the needs of its end users. In some cases, users of these systems must generally receive advanced training in order to understand how to define and input the rules for a given product or service, which drives up costs and reduces efficiency. In addition, customers often want to change, cancel, or renew services or products that were configured and sold to them using these systems. However, this is often difficult to do using these systems because, in many cases, such changes have to be handled manually or completed by system administrators who have the technical knowledge needed to make such changes, which can delay turnaround and lead to user and customer frustration.

SUMMARY

According to one innovative aspect of the subject matter described in this disclosure, a system includes one or more processors, a modeling engine, and a configuration engine. The modeling engine and the configuration engine are executable by the one or more processors to perform various acts. For instance, the modeling engine provides a rule definition table for presentation to a user and receives one or more inputs defining a rule for a model using the rule definition table. The configuration engine compiles the rule into a compiled rule that is executable during evaluation of the model. The configuration engine evaluates the model based on the compiled rule.

In general, another innovative aspect of the subject matter described in this disclosure may be embodied in methods that include providing a rule definition table for presentation to a user; receiving one or more inputs defining a rule for a model using the rule definition table; compiling the rule into a compiled rule that is executable during evaluation of the model; and evaluating the model based on the compiled rule.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include receiving an input defining one or more columns reflecting a rule condition; updating the rule definition table with the one or more columns reflecting the rule condition; receiving an input defining one or more columns reflecting a rule action; updating the rule definition table with the one or more columns reflecting the rule action; receiving an input defining one or more rule expressions for the rule condition and the rule action; updating the rule definition table with the one or more rule expressions; storing the rule definition table as the rule in a table-based format; that the compiling the rule into the compiled rule includes compiling the rule into one or more JavaScript objects; converting the rule definition table embodying the rule of the model into JSON formatted data; that compiling the rule includes compiling the JSON formatted data into one or more rule objects, the one or more rule objects including the compiled rule; that evaluating the model based on the compiled rule further includes receiving an evaluate instruction instructing to evaluate the model, retrieving the model, determining external data reflecting one or more configuration requirements of the user, injecting the external data into the model, initializing a corresponding configuration session, instantiating an in-memory model, injecting model instance data into the in-memory model, the model instance data including the model injected with the external data, and evaluating the model by processing the compiled rule associated with the model; re-evaluating the model; that re-evaluating the model further includes receiving a re-evaluate instruction instructing to re-evaluate the model, retrieving an instance of the model as previously evaluated, receiving a user selection configuring a product based on the model, merging the user selection with the model as previously evaluated into a merged model, retrieving an in-memory model, determining differences between the merged model and the in-memory model, applying the differences to the in-memory model and marking the differences as modified, and evaluating the model by processing the compiled rule associated with the model corresponding to the differences; and providing data describing the model as evaluated for presentation to the user.

For instance, the features may include that the one or more rule expressions includes one or more of values, variables, and functions for the one or more columns reflecting the rule condition and the rule action; and that the rule includes one or more of a product, an option group, and an attribute.

According to yet another innovative aspect of the subject matter described in this disclosure, a system includes one or more processors and a voting mechanism. The voting mechanism is executable by the one or more processors to perform certain acts. The voting mechanism receives a model definition including a rule having one or more option groups corresponding to an attribute; determines one or more votes cast by the rule for the attribute, each of the one or more votes being a vote for a value of the attribute; resolve the one or more votes cast by the rule to assign a specific value to the attribute; and generate a voting summary describing reason for the value assigned to the attribute.

In general, yet another innovative aspect of the subject matter described in this disclosure may be embodied in methods that include receiving a model definition including a rule having one or more option groups corresponding to an attribute; determining one or more votes cast by the rule for the attribute, each of the one or more votes being a vote for a value of the attribute; resolving the one or more votes cast by the rule to assign a specific value to the attribute; and generating a voting summary describing reason for the value assigned to the attribute.

These and other implementations may each optionally further include one or more of the following features. For instance, the operations may further include determining a type for the rule; processing the rule for the one or more votes based on the type of the rule; tracking the one or more votes cast by the rule; aggregating the one or more votes for the attribute; and determining a value for the attribute based on the aggregated votes.

The technology described herein is advantageous in a number of respects. For instance, the technology described herein can provide simplified product configuration and evaluation using a multi-dimensional table that is easy to use, understand, and configure. The technology described herein can convert the multi-dimensional table containing the product configuration into an optimized code or format that is interpretable and processable for evaluation such that any errors associated with the configuration can be easily determined and rectified. The technology described herein can also efficiently resolve conflicts that arise during a product configuration using a voting mechanism. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIG. 16A-B are graphical representations of example user interfaces for creating and/or managing rules.

DETAILED DESCRIPTION

The configuration technology discussed in this application enables entities across many industries, such as media, software, manufacturing, business services, telecommunications, high technology, etc., that have complex product lines or service offerings, to configure and quote any offering (e.g., products, services, etc.) interactively dramatically reducing the time required to respond to a quote and, as a result, the number of lost sales opportunities. In some cases, the configuration technology enables buyers, sales people, and third party users, etc., to easily and quickly configure complex product configurations without conflicts, receiving up-to-date pricing information in real-time during the process. The configuration technology simplifies the product configuration process by providing an intuitive, flexible user interface (UI). This allows users to use the configuration technology to model products, define rules for those products, receive quotes for the configured products, etc., without requiring those users to undergo advanced training, which can be expensive and challenging to provide to a potentially large number of selling partners, buyers and/or sales staff. The configuration technology includes logic and algorithms that leverages data, rules, and end-user (e.g., sales representatives, buyers, etc.) selections to configure the products. The configuration technology can provide the current product configuration state to the relevant users via a user interface. A configuration state may include product information such as a product description, the constituent components of the product (e.g., bill of material (BOM)), configuration error messages, pricing information, etc.

Figure 1:
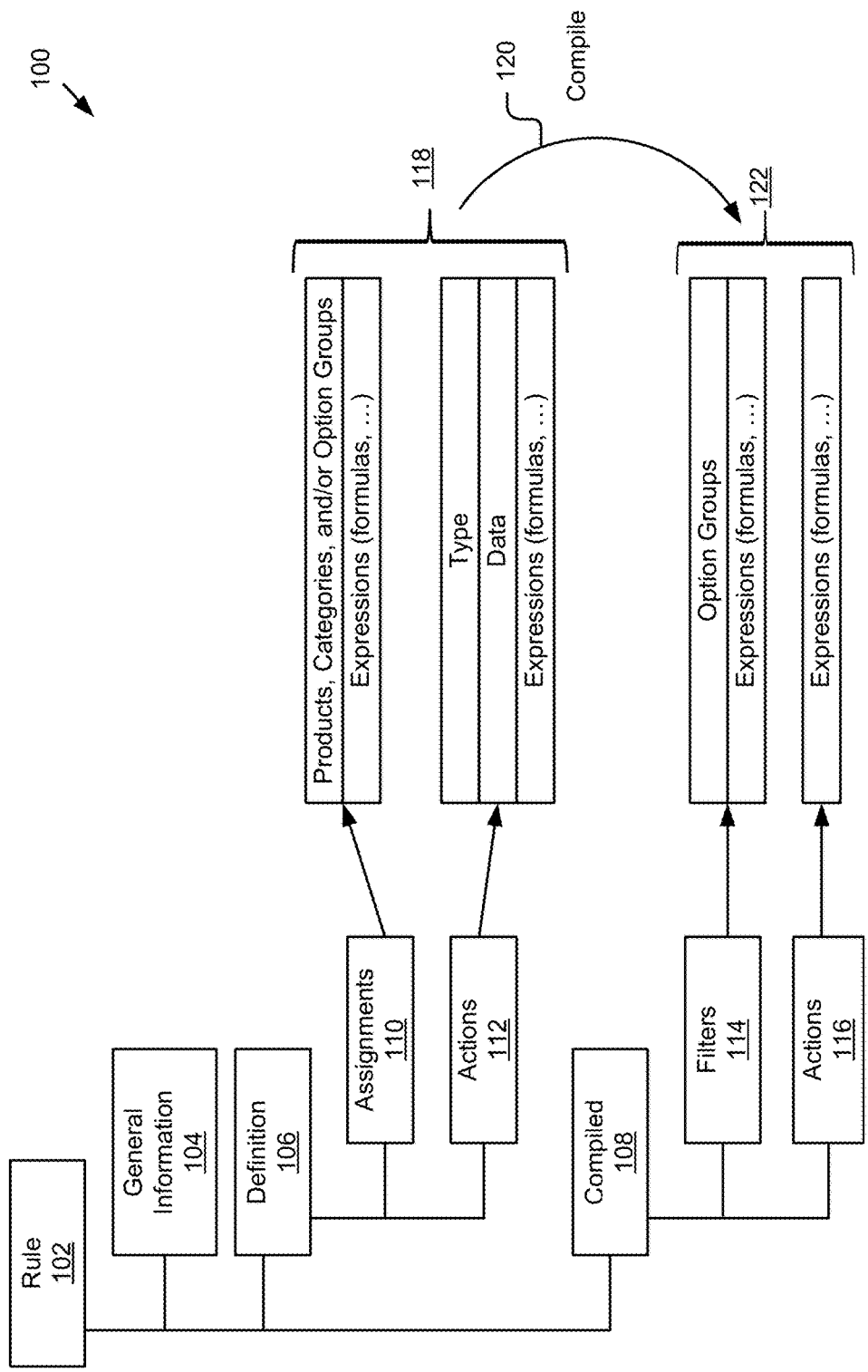
FIG. 1 is a block diagram illustrating an example rule architecture.

A product model (also referred to herein as a model) includes information that facilitates the configuration of a product. A product is generally any offering that can be sold. In addition to its plain meaning of a physical item or service, a product may be an item that is a configuration of other physical products or services and/or or virtual products or services. Rules drive the configuration for a given product. FIG. 1 is a block diagram illustrating an example architecture 100 for a rule 102.

As depicted, the rule 102 may include at least general information 104, a definition 106, and compiled code 108. The general information 104 may include information about the rule, such as, but not limited to, its name, description, id, lifecycle status, effective dates, creator, revision history, etc. The definition 106 may include a simplified representational view of the rule and that can be used to describe the rule in a user interface. The UI is generated by the configuration technology to view and/or edit the rule. The definition 106 may represent a structured way to create a rule based on one or more elements including predefined assignments 110 and actions 112.

The assignments 110 may be defined by the rule 102 and may determine when a rule is executed. The assignments 110 can associate the rule with various types of objects including, but not limited to, products, categories, and option groups as depicted in association with reference number 118 in the figure. Rule assignments 110 can be user defined (e.g., be explicit rule assignments) and/or automatically defined by system (e.g., be implicit rule assignments). Rule assignments 110 and/or actions 112 may be defined using one or more expressions, which may include various values, functions, variables, etc. In some implementations, rules can be explicitly assigned to various types of objects including attributes, products, and option groups, etc. If a rule has no explicit assignment, the configuration engine 726 (e.g., see FIG. 8C) may determine one or more option groups that could be impacted based on the action. For instance, if we had two option groups grp1 and grp2 that contained attribute attr1 and attr2, respectively, then a compatibility rule between attr1 and attr2 could create an implicit assignment with option groups grp1 and grp2.

Actions 112 may determine what the rule does when it is executed. Actions 112 can be categorized into different action types (also referred to as rule types). For each action type, the technology may provide users with an associated user interface for defining that rule using a structured data model (e.g., for storage and UI behavior) that may be compiled into compiled code 108 and executed. Example action/rule types include, compatibility, complex expression, conditionally required, conditionality visible, default selected options, option entitlement, price adjustment, raw, etc.

By way of further examples, the compatibility rule type may include a matrix comparing attributes, options groups, or products together. The complex expression rule type may include logic for calculating an attribute value, setting a custom message, etc. The conditionally required rule type may include logic specifying what option groups, products, categories, etc., are required/not required when certain condition(s) are satisfied. The conditionally visible rule type may include logic specifying what option groups, products, categories, etc., are visible/not visible when certain condition(s) are satisfied. The default selected options rule type may include which options are automatically selected (e.g., using an auto-complete function) and/or surfaced for selection, as well as the order in which they appear for selection. The option entitlement rule type may include logic based on customer properties such as segmentation (e.g., tier or type of customer). The price adjustment rule type may include logic specifying the condition(s) that must be met for a price adjustment to apply. The configuration technology may also be provided with raw rule types directly in compiled form, allowing for flexibility to create custom, complex, not-yet-defined rules. Each rule type may be based on a unique structured data model (for storage and UI behavior) as discussed elsewhere herein. In some cases, a rule type may include an else action that fires if the initial condition(s) are not met.

The assignments 110 and actions 112 may be compiled 120 into corresponding filters 114 and actions 116. The filters 114 of a rule 102 may determine the conditions for executing a rule and the actions 116 of a rule may determine what the rule 102 does when it is executed. Within a rule, one or more actions 116 can be added by the user (e.g., actions 112) or autonomously by the configuration engine 726 (e.g., see FIG. 8C). As depicted, a filter 114 may include one or more option group, and may trigger the execution of the rule 102 by the rules engine 844 (e.g., see FIG. 8C) if the option group has changed. The filter 114 may also include an expression (e.g., boolean expression) that determines whether the rule should be executed.

In some implementations, an advanced user may write the rule directly by inputting native code, such as JavaScript, into an applicable "rule builder" user interface provided by the technology. In some implementations, a rule may be compiled 120 and evaluated during authoring, and a user may view and edit it 108 in a user interface as he/she designs the rule. This is advantageous because the user can debug and/or visualize the actual code that is being generated and evaluated, and can start with a predefined rule action type and use the generated code as starting point to create more complex rule code directly. In some implementations, a rule may automatically be created and added to a model by the system (e.g., modeling engine 720, configuration engine 726 as shown in FIGS. 8B-C), for instance, to address a technical issue with a model configuration (e.g., add one or more selected products to a quote fact).

Figure 2:
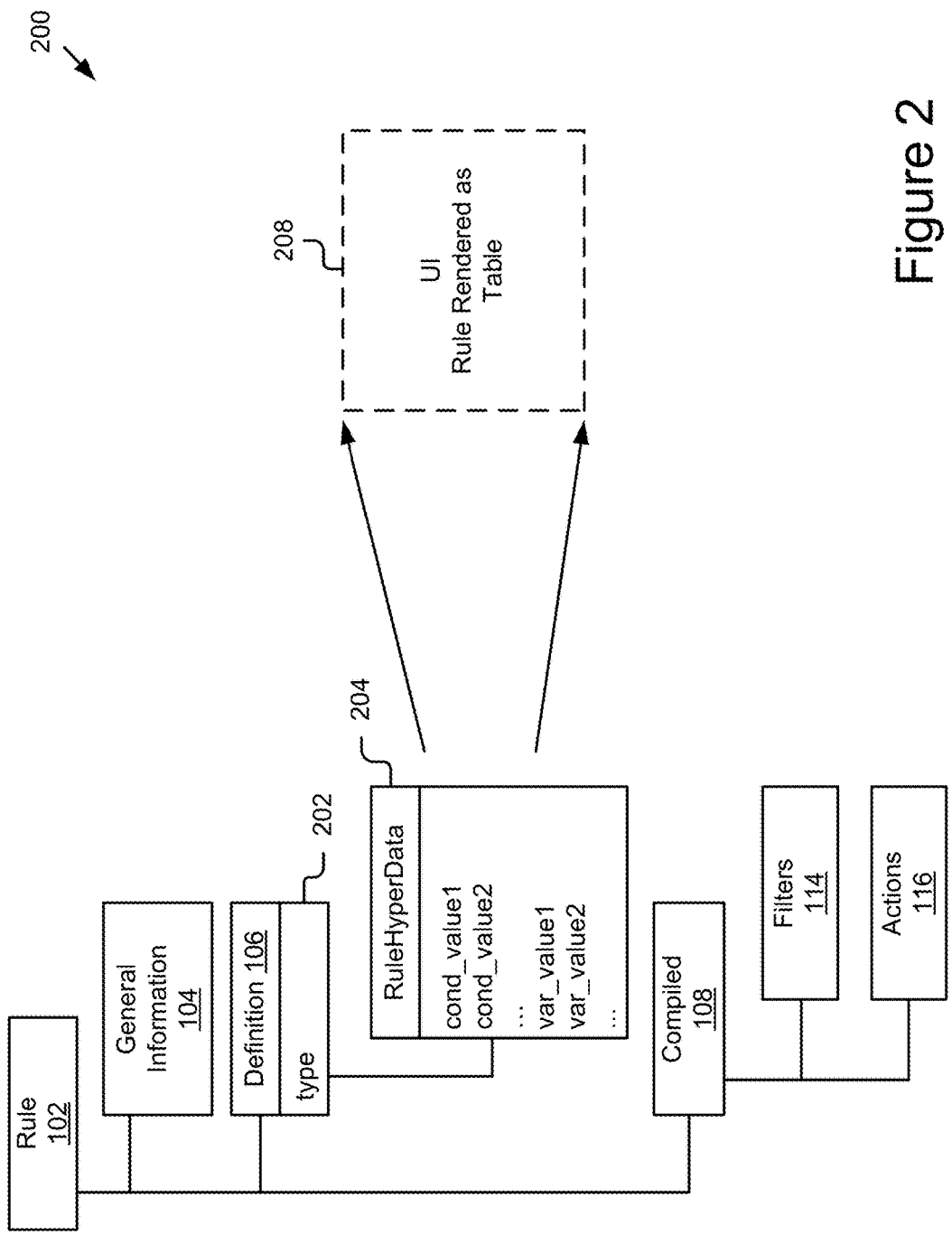
FIG. 2 is a block diagram illustrating an example rule definition.

FIG. 2 is a block diagram illustrating an example rule 102. As discussed with reference to FIG. 1, the rule 102 may include a general description 104, a definition 106, and compiled code 108 including filters 114 and actions 116. In addition, the rule 102 may include a type 202 that defines what type of rule the rule 102 is, and the requirements for defining a rule of that type. The rule 102 may also include RuleHyperData 204 having one or more entries (e.g., con-d_value 1 . . . n) defining one or more conditions of the rule 102, and one or more entries (e.g., var_value 1 . . . n) defining one or more actions to be taken if the conditions are met. The rule 102 may be composed, stored, and rendered for display in the user interface 208 as a multi-dimensional table for intuitive understanding and editing by the user, and which defines the relationships between the product(s), option group(s), attribute(s), categor(ies), etc., for that rule. The user interface 208 is beneficial as it allows for easy rule creation, interpretation, and/or modification by the user.

Figure 3:
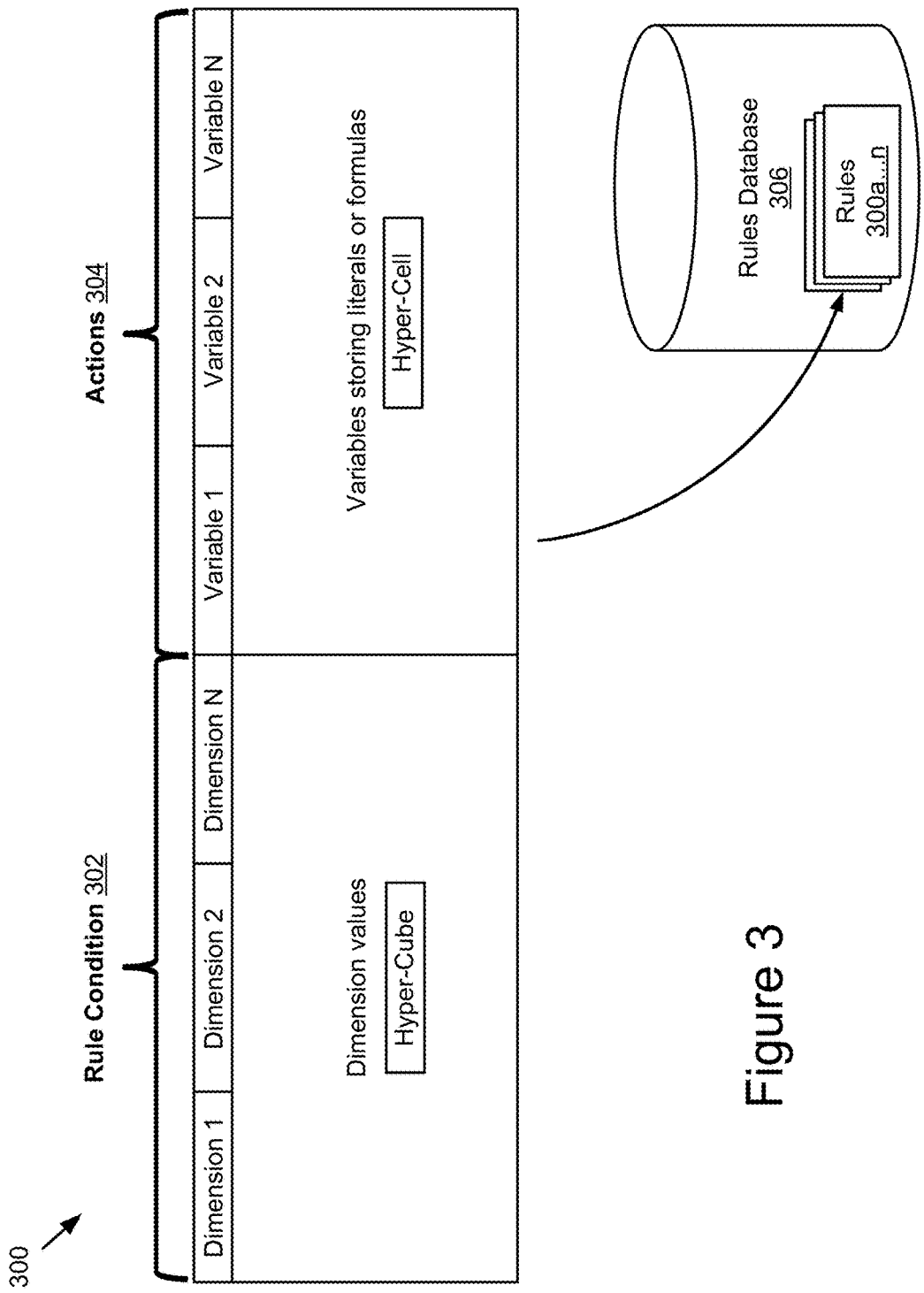
FIG. 3 illustrates a rules framework in a multi-dimensional table.

FIG. 3 illustrates an example multi-dimensional rule table 300. The rule table 300 may include at least two sets of one or more columns. The first set of columns represents item(s) associated with the rule condition used to determine when the rule should execute. The second set of columns represents the item(s) associated with the rule action defining the result of rule. For example, as depicted, the rule table 300 includes one or more columnar dimensions 1 . . . N as rule conditions 302 and one or more columnar variables 1 . . . . N as rule actions 304. Each rule condition column can represent a dimension of the rule condition. The dimensions may be based on any data element, such as product-related elements and/or customer-related elements. Product-related elements may include products, option groups, categories, attributes (e.g., types, names, colors, quantities, dimensions, other characteristics, etc.), attributes of options representing answers to questions (e.g., Bluetooth required yes/no, Storage Need in MB, etc.), etc. Customer-related elements may include geography, segmentation, distribution channel, etc. In various implementations, attributes may be provided directly or may be assigned to one or more options and/or products associated with the rule, as discussed in further detail elsewhere herein. The n-dimensional rule conditional may reflect a hypercube, with hyper-cells reflecting the actions that may occur should the dimensions be met.

The rule embodied by the rule table 300 may include one or more expressions reflected by the rows of the table 300. The expressions may include values, literals, and/or formulas corresponding to the dimensions and variables of the rule condition 302 and the one or more actions 304. For instance, each row entered into the table may express a set of dimension values that the configuration system 700 (e.g., see FIG. 7) may use to test if the rule condition is satisfied (e.g., evaluates to 'True') and one or more literals, formulas, etc., that reflect one or more results that should occur if the rule condition is satisfied. Each cell of the row within the rule condition portion of the table may be connected together with a boolean (e.g., AND, OR, etc.). The rule 300 may be stored in and retrieved from a database 306 as a table. The database 306 may store and provide access to all rules 300a . . . n created using the configuration system 700 (e.g., see FIG. 7).

Figure 4:
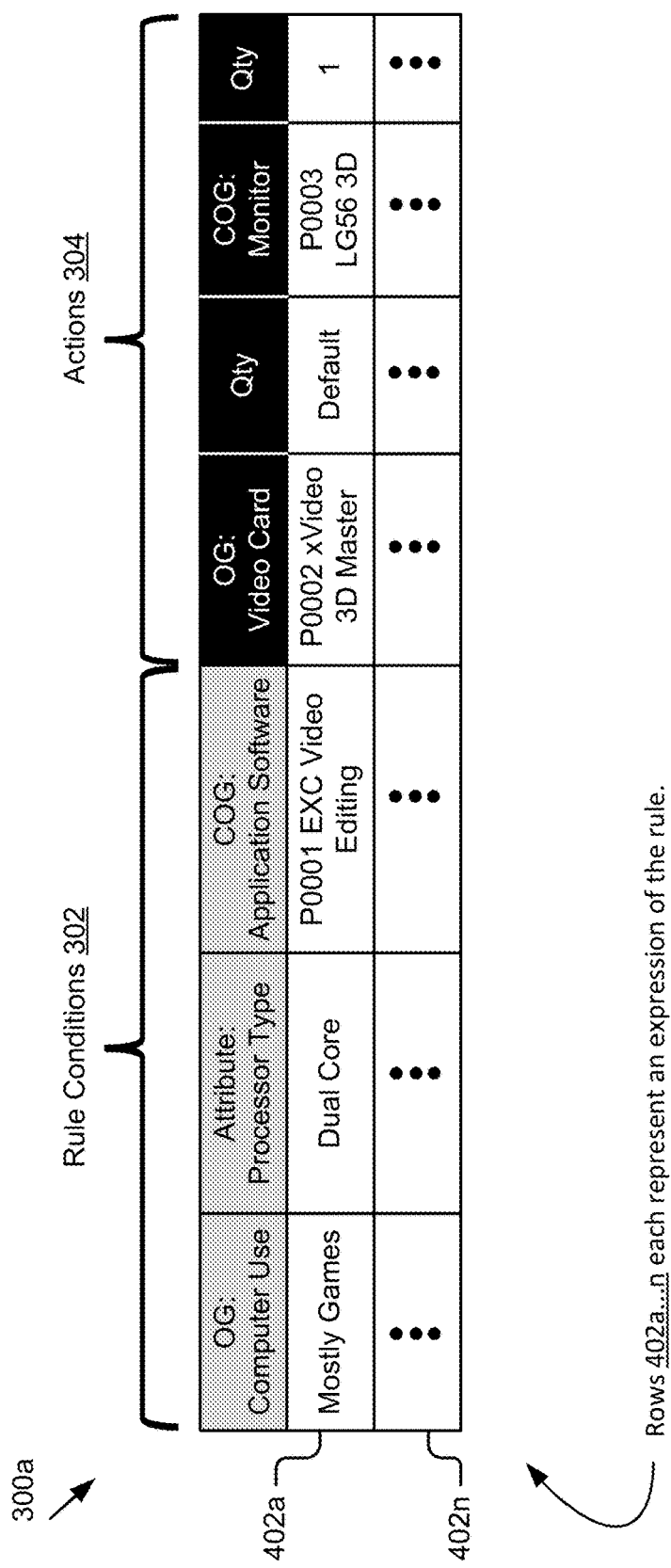
FIG. 4 illustrates an example rule framework including rule conditions and actions in a multi-dimensional table.

FIG. 4 illustrates an example multi-dimensional auto-select rule table 300a. As depicted, the first set 302 of columns in the rule table 300a represents the rule condition (e.g., "IF") portion of the rule and the second set 304 of one or more columns represent the rule action (e.g., "THEN") portion of the rule. Since more than one column is included in the first set in this example, these columns are linked by a boolean (e.g., "AND").

In particular, the first set of columns 302 includes possible selections (e.g., options, products, categories, attributes, etc.) for a configurable product, and the second set of columns 304 represents items and quantities that are to be used if the rule condition of the first set 202 of columns is satisfied. In this example, the OG (option group) columns describe one or more valid option groups; the COG (category option group) columns describe one or more valid product IDs; the attribute column describes a valid attribute value; and the qty columns describe a valid quantity. In some instances, default values may be used in the rule expressions. For instance, the quantity may default to a specific value (e.g., 1), but can range from 1 to 9999999.

While various examples discussed herein are discussed within the context of a rule being expressed in form of an 'IF' (rule condition) clause and a 'then' (rule action) clause, it is not limited to such and other rule condition and action types are contemplated and fall within the scope of this disclosure.

Each row 402a . . . n of the rule table 300a represents an expression (e.g., values, variables, text, etc.) of the rule including appropriate values for the rule conditions 302 and actions 304. Using the example in FIG. 4, the expression 402a of the auto-select rule embodied by the rule table 300a could read: IF OG:Computer Use="Mostly Games" AND Attribute:Processor Type="Dual Core" AND COG:Application Software="P0001 EXC Video Editing", THEN select OG:Video Card="P0002 xVideo 3D Master" with Qty="Default" AND COG:Monitor="P00032 LG56 3D" with Qty=1.

Figure 5:
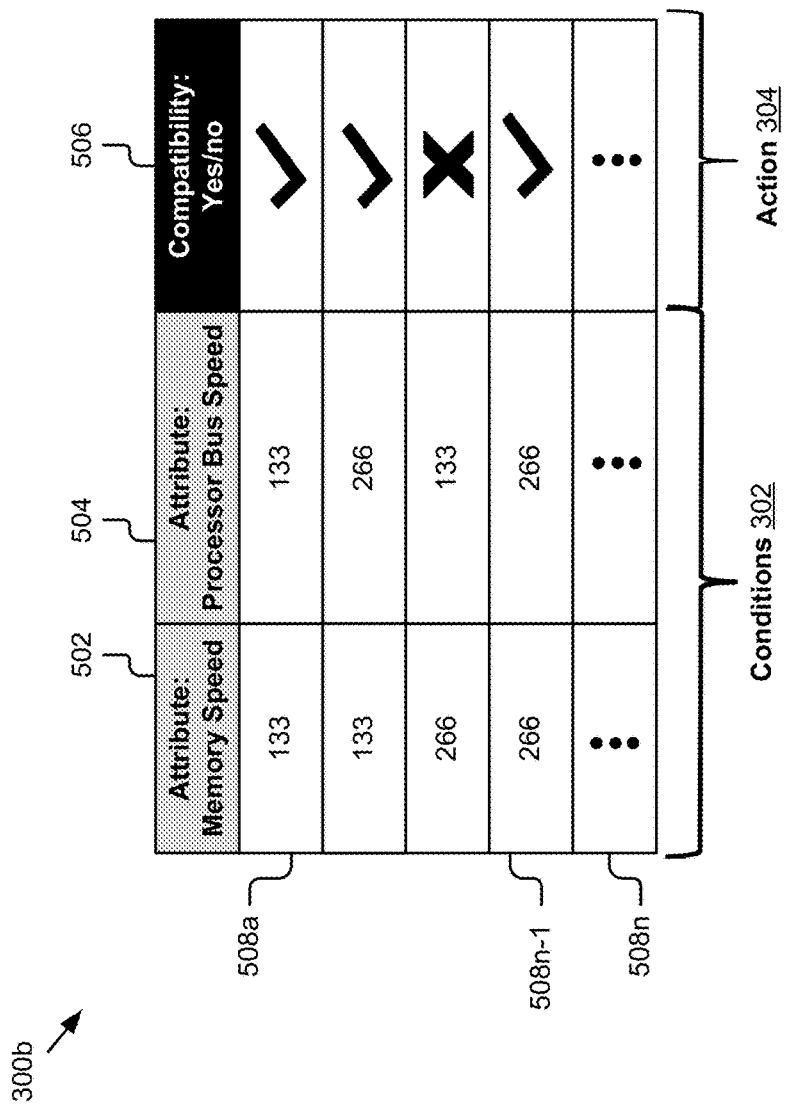
FIG. 5 illustrates an example compatibility rule table.

FIG. 5 illustrates an example multi-dimensional compatibility rule table 300b. As depicted, the table 300b includes an attribute column "memory speed" 502 and an attribute column "processor bus speed" 504 as rule conditions 302 and compatibility column 506 as a rule action 304. These attributes 502 and/or 504 may be assigned to particular products or options of a model and classified into specific categories. For example, the attribute 502 "memory speed" can be categorized under the category "RAM" and the attribute 504 "processor bus speed" can be categorized under the category "CPU". While attributes are used for the rule dimensions in this example, it should be understood that other dimensions could also be used, such as options, option groups, categories, products, etc.

The compatibility rule represented by the rule table 300b may include a plurality of rule expressions 508a . . . 508n, which are implemented as rows and where each row maps various attributes values to a compatibility determination. For example, as shown in row 508a, if both the memory and processor bus have a speed of 133 MHz, then they are determined to be compatible. In contrast, if the memory has a speed greater than the processor bus (e.g., 266 MHz vs. 133 MHz, respectively), than they are determined to be incompatible, as shown in row 508n-1.

Figure 6:
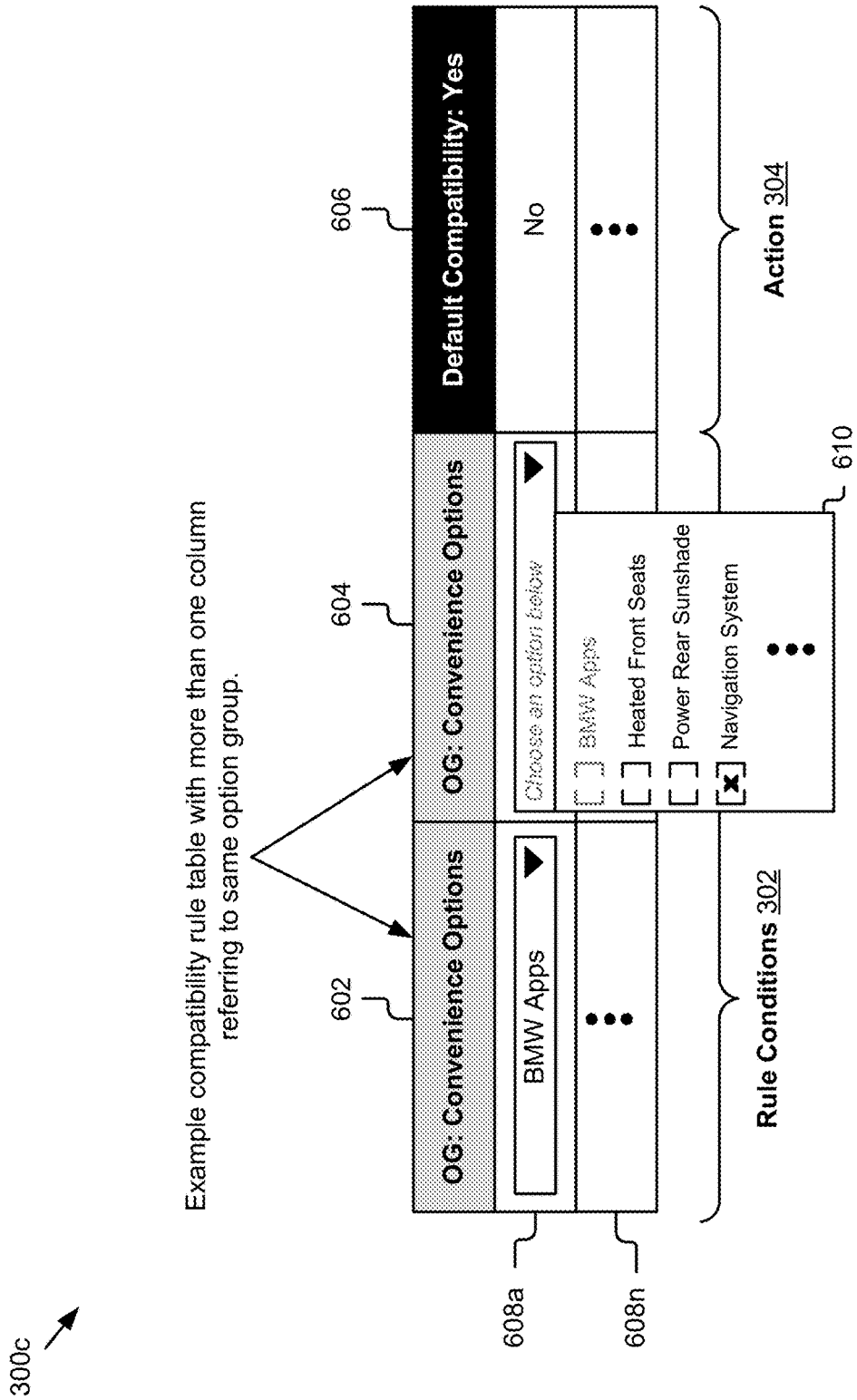
FIG. 6 illustrates an example compatibility rule table with more than one column referring to same option group.

FIG. 6 illustrates another example compatibility rule table 300c. In this figure, the rule conditions 302 include more than one column that refers to the same option group, and the cells corresponding to those columns provide a user-selectable drop-down menu 610 that allows the user to select one or more convenience options. The compatibility rule represented by the rule table 300c may include a plurality of rule expressions 608a . . . 608n, which are implemented as rows and where each row maps convenience options combinations in columns 602 and 604 (which serve as the rule condition 302) to a compatibility determination in column 606 (which serves as the rule action 304). In this example, when creating the rule a user selected "BMW apps" as the first convenience option and a "navigation system" as the second convenience option, which are determined to be incompatible because, for example, the BMW apps may already include a navigation system. In some cases, multiple options for a single cell may be selected using the drop down menu 610. Further, in some implementations, an authoring user may input various rule expressions 608a . . . 608n to define the various compatible and incompatible combinations, and then during modeling the compatibility between two or more selected options from the convenience options group may automatically be determined based on the options chosen for the model.

Figure 17A:
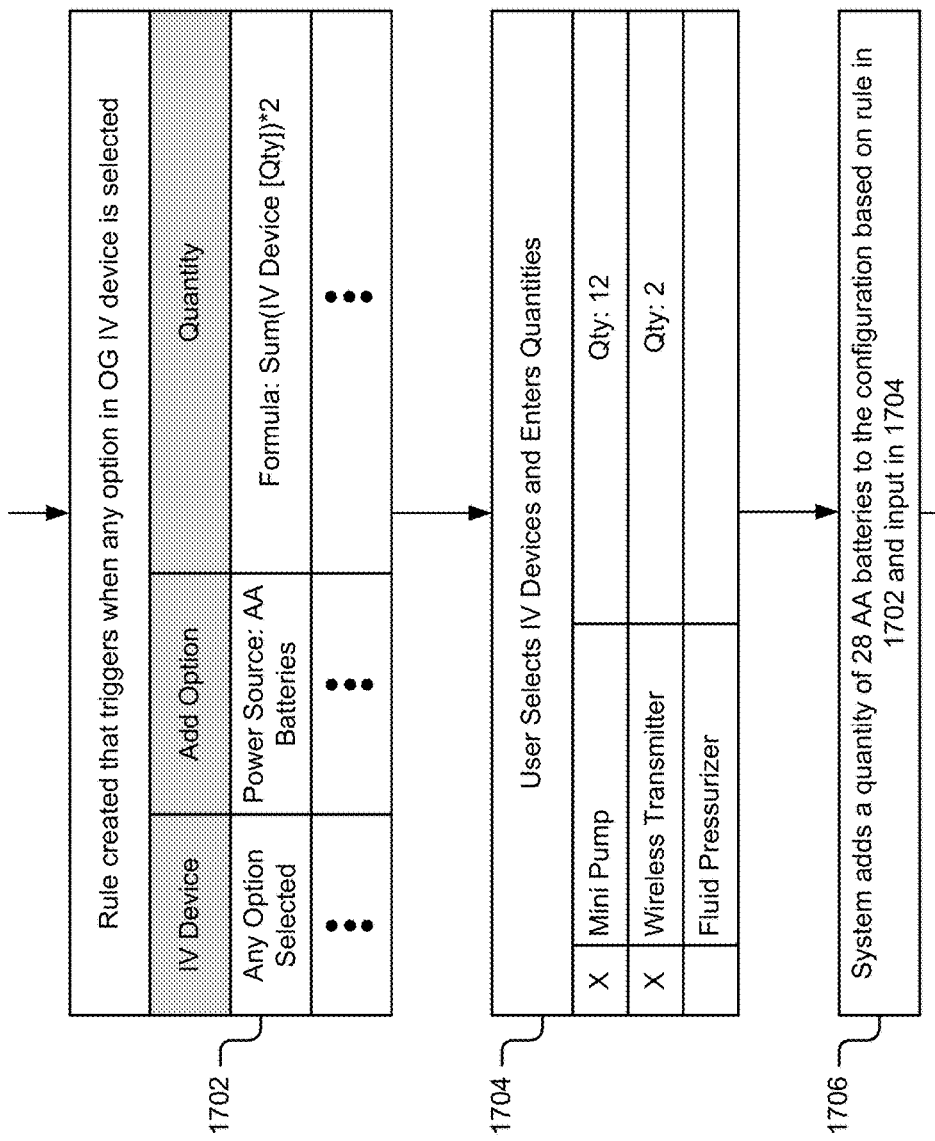
FIGS. 17A and 17B depict example rule tables that include formulas and example processes for executing the formulas.
Figure 17B:
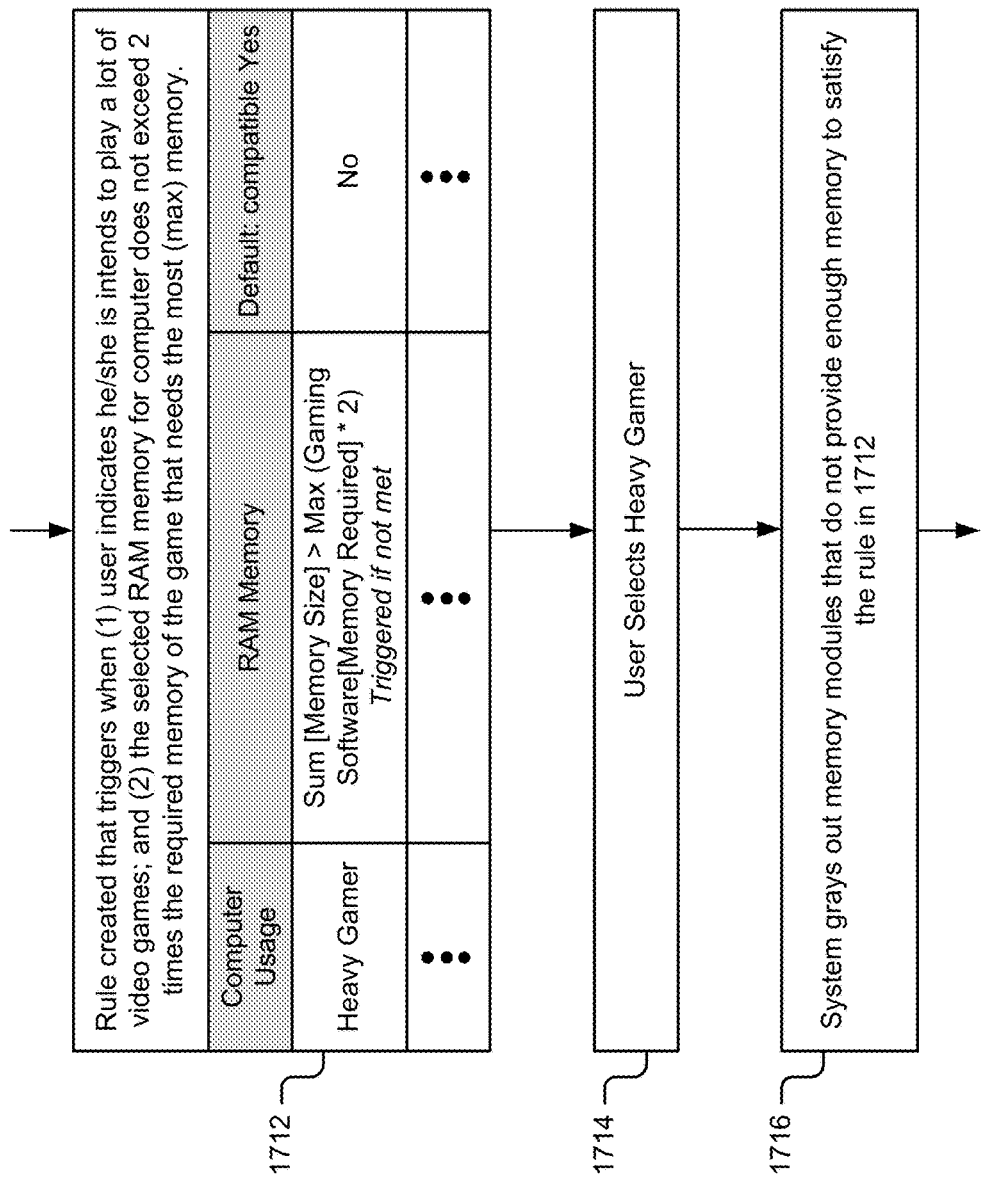

FIGS. 17A and 17B depict example rule tables that include formulas and example processes for executing the formulas. With reference to FIG. 17A, in block 1702, a rule may be created that triggers when any option in the IV device option group is selected. The action of this rule adds, for each IV device the customer selects, the necessary number (i.e., 2) of AA batteries to power that device. In block 1704, the user inputs 12 mini pumps and 2 wireless transmitters, totaling 14 devices. As each of these devices needs 2 AA batteries, the system adds a quantity of 28 AA batteries to the configuration because the formula doubles the total quantity of the devices (i.e., 14) to arrive at the correct quantity of AA batteries needed (i.e., 28). With reference to FIG. 17B, in block 1712, a rule may be created that triggers when (1) the user indicates he/she is intends to play a lot of video games; and (2) the selected RAM memory for computer does not exceed 2 times the required memory of the game that needs the most (max) memory. The action of this rule grays out the memory modules that do not provide enough memory to satisfy the rule condition. For instance, in block 1714, the user selects that he/she is a heavy gamer, and in response, in block 1716 the system grays out the memory modules being displayed that do not provide enough memory to satisfy the rule in 1712.

Figure 7:
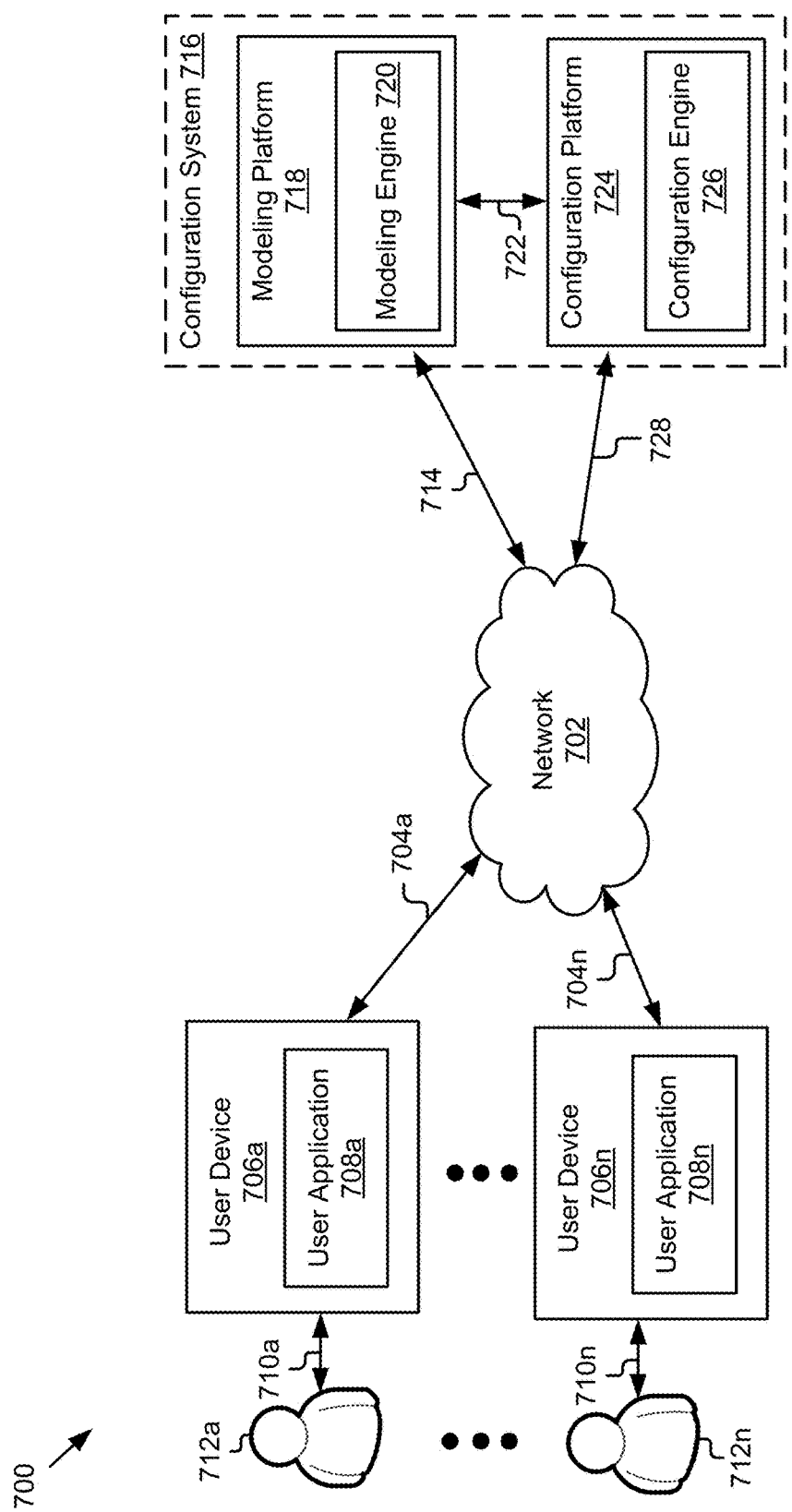
FIG. 7 is a block diagram illustrating an example system for configuring products.

FIG. 7 is a block diagram of an example system 700 for configuring products. The illustrated system 700 includes user devices 706*a* . . . 706*n* and a configuration system 716, which are communicatively coupled via a network 702 for interaction with one another. For example, the user devices 706*a* . . . 706*n* may be respectively coupled to the network 702 via signal lines 704*a* . . . 704*n* and may be accessible by users 712*a* . . . 712*n* (also referred to individually and collectively as 712) as illustrated by lines 710*a* . . . 710*n*. As depicted in the figure, the configuration system 716 includes a modeling platform 718 and a configuration platform 724. The modeling platform 718 may be respectively coupled to the network 702 via signal line 714, the configuration platform 724 may be coupled to the network 702 via signal line 728, and the modeling platform 718 and the configuration platform 724 may be coupled to each other via signal line 722. The use of the nomenclature "a" and "n" in the reference numbers indicates that the system 700 may include any number of those elements having that nomenclature.

It should be understood that the system 700 illustrated in FIG. 1 is representative of an example system for configuring products, and that a variety of different system environments and configurations are contemplated and are within the scope of the present disclosure. For instance, some implementations may include additional or fewer computing devices, services, and/or networks, and may implement various functionality user or configuration system-side. Further, various entities of the system may be integrated into to a single computing device or system or additional computing devices or systems, etc.

The network 702 may include any number of networks. For example, the network 702 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The user devices 706*a* . . . 706*n* (also referred to individually and collectively as 706) are computing devices having data processing and communication capabilities. In some implementations, a user device 706 may include a processor (e.g., virtual, physical, etc.), a memory, a power source, a communication unit, and/or other software and/or hardware components, including, for example, a display, graphics processor, wireless transceivers, keyboard, camera, sensors, firmware, operating systems, drivers, various physical connection interfaces (e.g., USB, HDMI, etc.). The user devices 706*a* . . . 706*n* may couple to and communicate with one another and the other entities of the system 700 via the network 702 using a wireless and/or wired connection.

Examples of user devices 706 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more user devices 706 are depicted in FIG. 1, the system 700 may include any number of user devices 706. In addition, the user devices 706*a* . . . 706*n* may be the same or different types of computing devices.

In the depicted implementation, the user devices 706*a* . . . 706*n* respectively contain instances 708*a* . . . 708*n* of a user application (also referred to individually and collectively as 708). The user application 708 may be storable in a memory (not shown) and executable by a processor (not shown) of a user device 706. The user application 708 may include a browser application that can retrieve and/or process information hosted by one or more entities of the system 700 (for example, the modeling platform 718 and/or the configuration platform 724) and can present the information on a display device (not shown) on the user device 706.

The configuration system 716 may include one or more computing devices having data processing, storing, and communication capabilities. For example, the configuration system 716 and/or its constituent components like the modeling platform 718 and/or the configuration platform 724 may include one or more hardware servers, virtual servers, server arrays, storage devices and/or systems, etc., which may be networked via the network 702 for cooperation and communication with one another. In some implementations, the configuration system 716, including the modeling platform 718 and/or configuration platform 724, may be implemented using cloud-based architectures where one or more computer functions are performed by remote computing systems and devices at the request of a local computer device, although further implementations are also contemplated where the modeling platform 718 and/or configuration platform 724 are implemented using local hardware and/or software resources or a combination of the foregoing. Additional structure, acts, and/or functionality of the modeling platform 718 and the configuration platform 724 are described in further detail elsewhere herein.

Figure 8A:
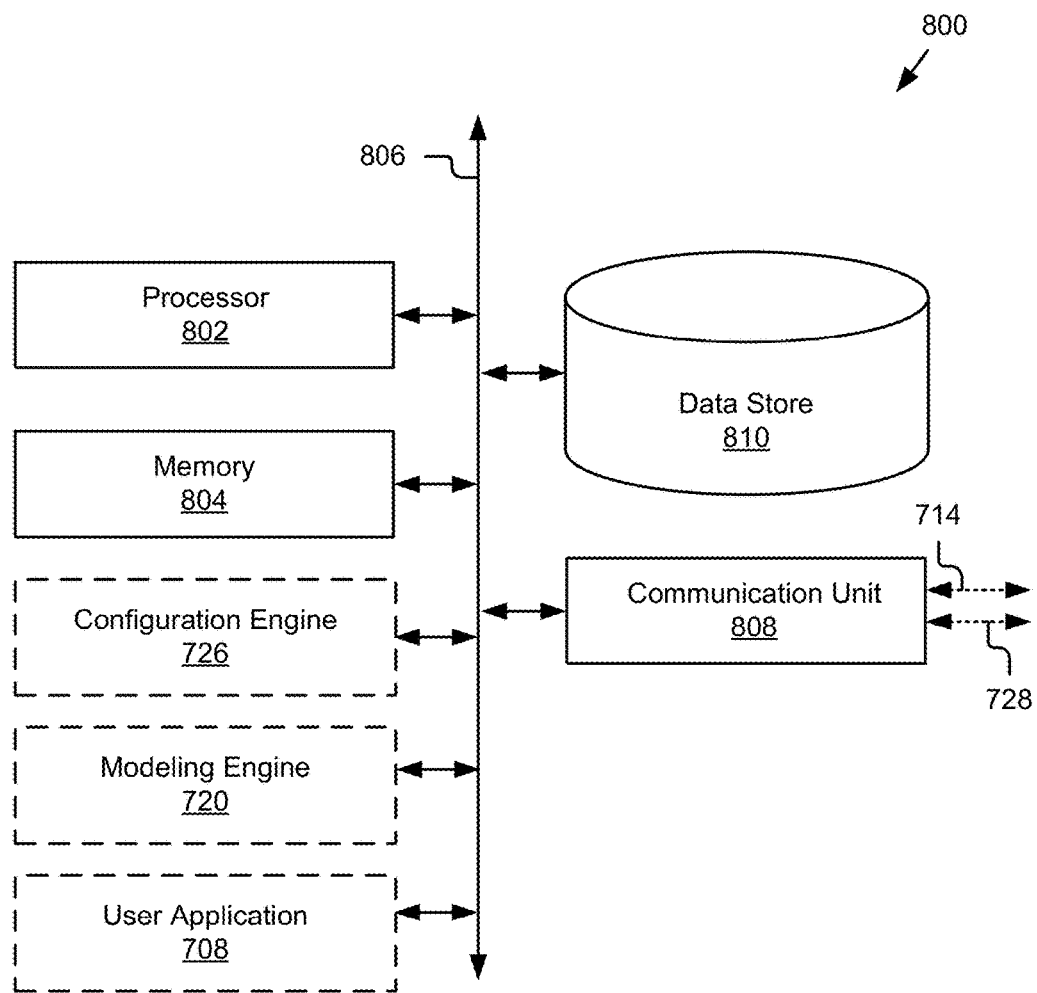
FIG. 8A is a block diagram of an example computing device.
Figure 8B:
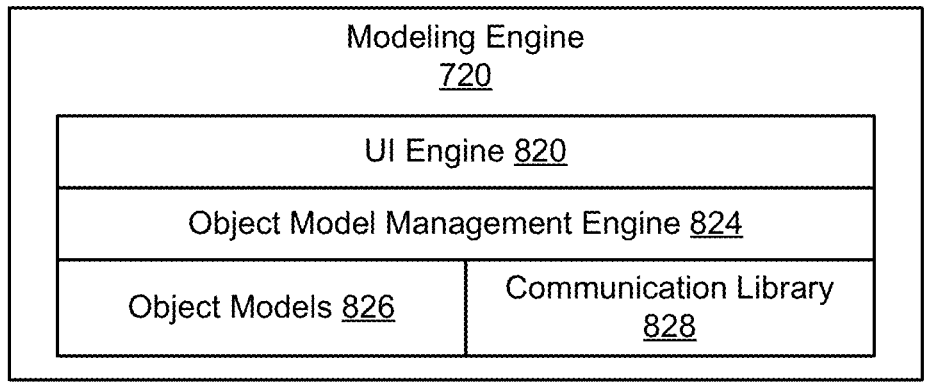
FIG. 8B is a block diagram of an example modeling engine.
Figure 8C:
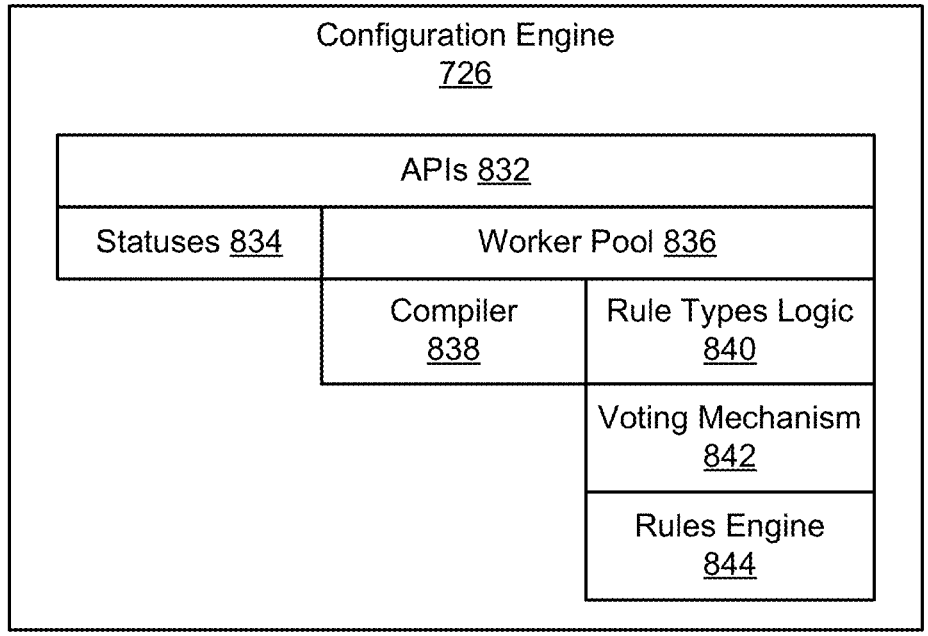
FIG. 8C is a block diagram of an example configuration engine.

FIG. 8A is a block diagram of an example computing device 800, which may be representative of a computing device included in the configuration system 716, the modeling platform 718, the configuration platform 724, and/or the user device 706. As depicted, the computing device 800 may include a processor 802, a memory 804, a communication unit 808, a data store 810, and one or more of a configuration engine 726, a modeling engine 720, and the user application 708, which may be communicatively coupled by a communication bus 806.

Depending upon the configuration, the computing device 800 may include differing components. For instance, in a configuration system implementation, the computing device 800 may include the modeling engine 720 and/or the configuration engine 726. In a user device configuration, the computing device 800 may include the user application 708. In further implementations, a first computing device 800 representative of the modeling platform 718 may include the modeling engine 720, a second computing device 800 representative of the configuration platform 724 may include the configuration engine 726, and a plurality of third computing devices 800 representative of the user devices 706*a* . . . 706*n* may respectively include the user applications 708*a* . . . 708*n*. It should be understood that the above configurations are provided by way of example and numerous further configurations are contemplated and possible.

The processor 802 may execute software instructions by performing various input/output, logical, and/or mathematical operations. The processor 802 may have various computing architectures to process data signals including, for example, a complex instruction set computer (CISC) architecture, a reduced instruction set computer (RISC) architecture, and/or an architecture implementing a combination of instruction sets. The processor 802 may be physical and/or virtual, and may include a single core or plurality of processing units and/or cores. In some implementations, the processor 802 may be capable of generating and providing electronic display signals to a display device (not shown), supporting the display of images, capturing and transmitting images, performing complex tasks including various types of feature extraction and sampling, etc. In some implementations, the processor 802 may be coupled to the memory 804 via the bus 806 to access data and instructions therefrom and store data therein. The bus 806 may couple the processor 802 to the other components of the general configuration system 800 including, for example, the memory 804, communication unit 808, and the data store 810.

The memory 804 may store and provide access to data to the other components of the computing device 800. In some implementations, the memory 804 may store instructions and/or data that may be executed by the processor 802. The memory 804 is also capable of storing other instructions and data, including, for example, an operating system, hardware drivers, other software applications, databases, etc. The memory 804 may be coupled to the bus 806 for communication with the processor 802 and the other components of the computing device 800.

The memory 804 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 802. In some implementations, the memory 804 may include one or more of volatile memory and non-volatile memory. For example, the memory 804 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 804 may be a single device or may include multiple types of devices and configurations.

The bus 806 can include a communication bus for transferring data between components of a computing device or between computing devices, a network bus system including the network 702 or portions thereof, a processor mesh, a combination thereof, etc. In some implementations, the configuration engine 726 and the modeling engine 720 may cooperate and communicate via a software communication mechanism implemented in association with the bus 806. The software communication mechanism can include and/or facilitate, for example, inter-process communication, local function or procedure calls, remote procedure calls, network-based communication, secure communication, etc.

The communication unit 808 may include one or more interface devices for wired and wireless connectivity with the network 702 and the other entities and/or components of the system 700 including, for example, the user devices 706, the modeling platform 718, the configuration platform 724, etc. For instance, the communication unit 808 may include, but is not limited to, CAT-type interfaces; wireless transceivers for sending and receiving signals using Wi-Fi™; Bluetooth®, cellular communications, etc.; USB interfaces; various combinations thereof; etc. The communication unit 808 may be coupled to the network 702 via the signal lines 714 and 728. In some implementations, the communication unit 808 can link the processor 802 to the network 702, which may in turn be coupled to other processing systems. The communication unit 808 can provide other connections to the network 702 and to other entities of the system 700 using various standard communication protocols, including, for example, those discussed elsewhere herein.

The data store 810 is an information source for storing and providing access to data. In some implementations, the data store 810 may be coupled to the components 802, 804, 808, 726, 720, and/or 708 of the computing device 800 via the bus 806 to receive and provide access to data. In some implementations, the data store 810 may store data received from the other entities 706, 718, and 724 of the system 700, and provide data access to these entities. The data store 810 can include one or more non-transitory computer-readable mediums for storing the data. In some implementations, the data store 810 may be incorporated with the memory 804 or may be distinct therefrom. In some implementations, the data store 810 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

FIG. 8B is a block diagram of an example modeling engine 720. As depicted, the modeling engine 720 may include a UI engine 820, an object model management engine 824, object models 826, and a communication library 828. The components 720, 820, 824, 826, and/or 828 may be communicatively coupled by the bus 806 and/or the processor 802 to one another and/or the other components 804, 808, and 810 of the computing device 800. In some implementations, one or more of the components 720, 820, 824, 826, and/or 828 are sets of instructions executable by the processor 802 to provide their functionality. In other implementations, one or more of the components 720, 820, 824, 826, and/or 828 are stored in the memory 804 of the modeling platform 718 and are accessible and executable by the processor 802 to provide their functionality. In any of the foregoing implementations, these components 720, 820, 824, 826, and/or 828 may be adapted for cooperation and communication with the processor 802 and other components of the modeling platform 718.

Figure 16A:
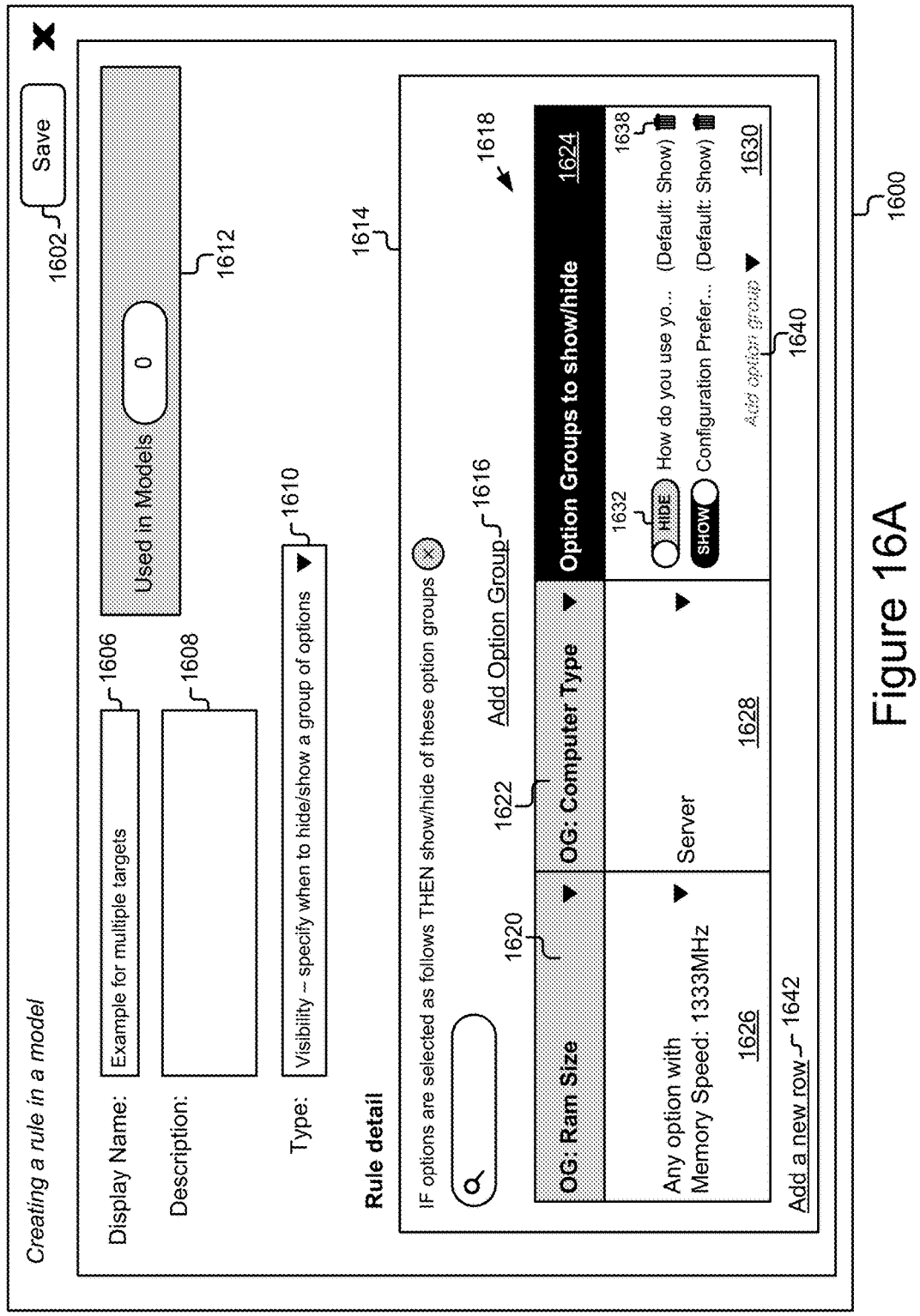

The UI engine 820 includes software and/or logic for generating a user interface, rendering the interface for display to a user, receiving one or more inputs from the user on the user interface, and updating the interface based on the one or more inputs. For instance, the UI engine 820 can generate an interface including one or more interface components (e.g., as depicted in FIGS. 16A-B) using which a modeler can create/configure a model or create/configure one or more rules for a particular model (e.g., using the rule tables depicted in FIGS. 3-5 and 16A-B). In some implementations, the UI engine 820 may also be configured to receive data from the configuration engine 726 and render the data for display to a user. For instance, the UI engine 820 may receive data describing evaluation of a model that is performed by the configuration engine 726 and provide the data (e.g., results, votes, errors, etc.) for display to a user on a user device. In some implementations, the data may be formatted using a markup language such as HTML, XML, JSON, etc., and provided by the UI engine 829 for rendering and display via the user application 708, which may be on a computer or mobile device.

The object model management engine 824 includes software and/or logic for managing one or more object models 826. For instance, an object model 826 may include data describing the model including, for example, one or more option groups, rules, products, attributes, options, etc., being configured and/or defined by a user. The object model management engine 824 may be responsible to keep these object models 826 up-to-date based on user configurations associated with the models. By way of example, if a user adds and/or deletes one or more options groups, rules, attributes, etc. to/from a particular model, then the object model management engine 824 may incorporate these changes in the corresponding object model 826.

Figure 8D:
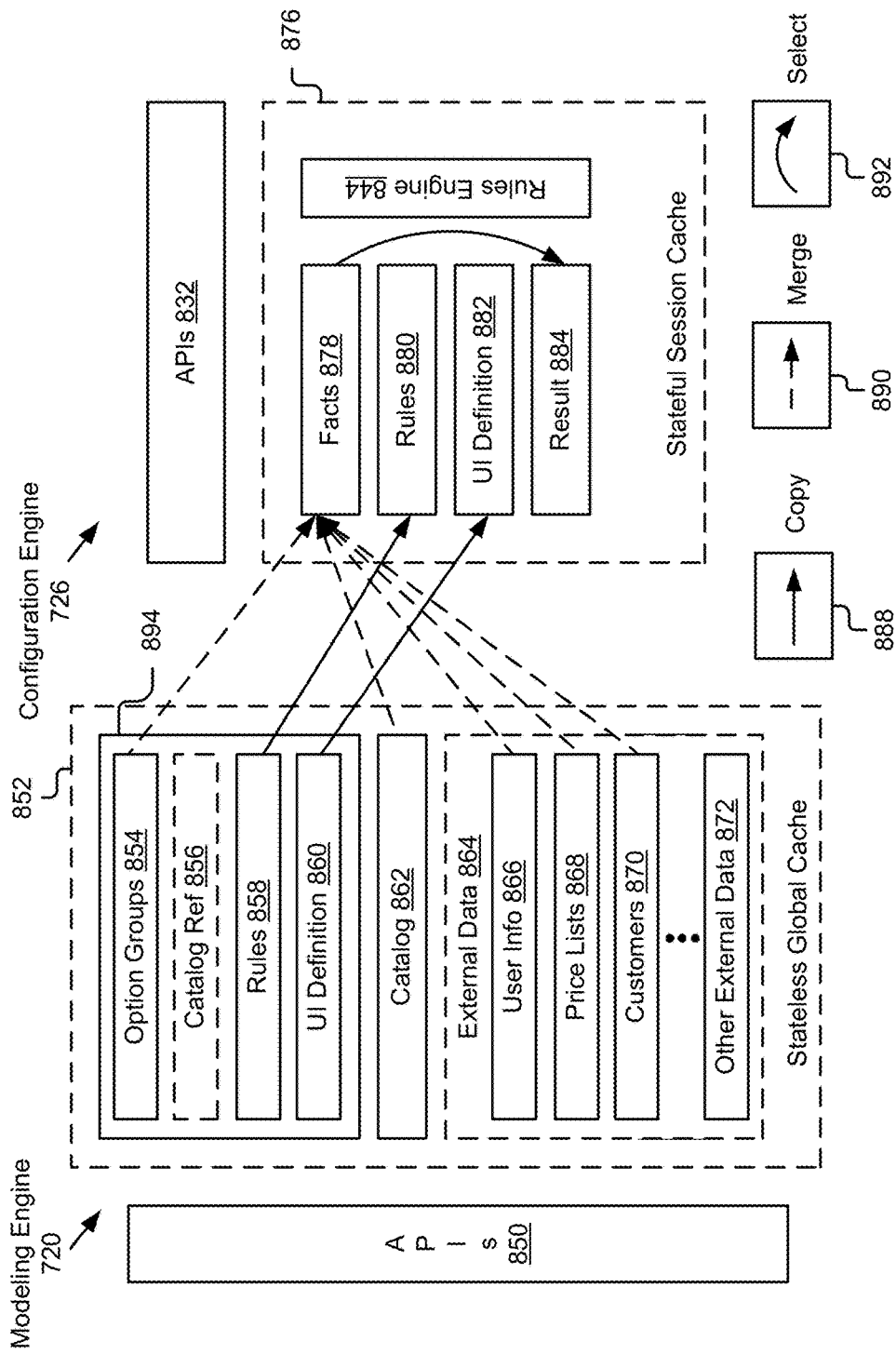
FIG. 8D depicts interaction between an example modeling engine and an example configuration engine.

The communication library 828 includes software and/or logic for interacting with the APIs of the configuration engine 726. For instance, the modeling engine 720 and one or more its components (e.g., UI engine 820, object model management engine 824, etc.) may be coupled to and communicate with the communication library 828 to interact with the API 832 of the configuration engine 726 for accessing various functionality, acts, and/or data provided by the configuration engine 726 and/or its respective components. In some implementations, the communication library 828 may include APIs (e.g., API 850 as shown in FIG. 8D), which various components of the system 700 may use to access functionality, acts, and/or data provided by the modeling engine 720.

FIG. 8C is a block diagram of an example configuration engine 726. As depicted, the configuration engine 726 may include APIs 832, statuses 834, a worker pool 836, a compiler 838, rule types logic 840, a voting mechanism 842, and a rules engine 844. The components 726, 832, 834, 836, 838, 840, 842, and/or 844 may be communicatively coupled by the bus 806 and/or the processor 802 to one another and/or the other components 804, 808, and 810 of the computing device 800. In some implementations, one or more of the components 726, 832, 834, 836, 838, 840, 842, and/or 844 are sets of instructions executable by the processor 802 to provide their functionality. In other implementations, one or more of the components 726, 832, 834, 836, 838, 840, 842, and/or 844 are stored in the memory 804 of the computing device 800 and are accessible and executable by the processor 802 to provide their functionality. In any of the foregoing implementations, these components 726, 832, 834, 836, 838, 840, 842, and/or 844 may be adapted for cooperation and communication with the processor 802 and other components of the computing device 800.

The configuration engine 726 may be implemented as an in-memory engine using a Node.js platform, which is a software platform for easily building fast, scalable network applications using JavaScript. Implementing the in-memory engine using the Node.js platform is beneficial because it is based on an event-driven, non-blocking I/O model that makes it lightweight and efficient for data-intensive real-time applications that run across distributed devices.

In some implementations, the configuration engine 726 may or may not have its own persistence of the models. In either case, the configuration engine may be stateful in that it keeps a model in local memory during a configuration session (e.g., see FIG. 8D). The state can be reconstructed in a future request. In some cases, the configuration engine 726 may not use a distributed memory solution for performance reasons (e.g., it may be too slow to move the model across the wire for every request). The in-memory model may be parsed and indexed/hashed for better efficiency. The configuration may include a series of layers that provide a reusable and modular architecture. In some cases, the utility of each layer may be accessible via the APIs 832.

The APIs 832 includes software and/or logic for accessing the configuration engine 726 and/or its constituent components. The configuration engine 726 may be deployed in an on-demand environment and the APIs 832 may enable access to various acts and/or functionality of the configuration engine 726. In some implementations, the APIs 832 relay requests and responses from the other software applications to the appropriate components of the configuration engine 726 for processing. The requests and responses may contain a full representation of the model or only a partial representation of the model for performance reasons. The APIs 832 may also provide access to stored data. In some implementations, the APIs 832 may require an interfacing software application to authenticate using a standard authentication protocol before utilizing the functionality of the APIs. In some implementations, the configuration engine 726, such as the worker pool 836, may expose the APIs through a RESTful interface.

Example APIs may include, but are not limited to, GET/status; POST/compile; POST/eval; and GET/logout. The GET/status API can return the status of a worker pool. It can loop over the current workers of the worker pool and return the memory usage of each of them. Example output may be producing using:

```
{
    sessionAvgMem: ____,
    freeMemRatio: $(memory.free / memory.total),
    capacity = Math.floor((memory.free - (memory.total*0.05))/ sessionAvgMem),
    memory: {
        free: ____
        total: ____
        heapUsed: ____
    },
    cpu: {
        loadavg: ____
    },
    workers: {
        available = ____,
        assigned = ____,
        total = ____,
        memory = ____,
    }
}
```

The POST/compile API can expose the model compilation logic of the compiler 838, which is discussed in further detail herein. This API may require a non-compiled model as an argument. In some implementations, the non-compiled model may be provided in a particular format, such as a JSON format.

The POST/eval API can expose the evaluation logic of the rules engine 844, which is discussed in further detail herein. For instance, this API can be used to run a model based on a user selection. This API may require a compiled model and identifier as arguments. This API may use the identifier to identify the worker to redirect the request to. In some cases, the identifier may be a HEADER session id token.

In some implementations, calling the POST/compile API may return performance numbers associated with the compilation, including, for instance how much time it took to compile the model, and if the model was evaluated immediately after compilation, how much time it took to evaluate the model. An example of the output may be represented as:

```
"perp":{
    "compileTime":15,
    "evalTime":28
}
```

The GET/logout API can destroy a worker and release the memory allocated to it. This API may require an identifier as an argument, which can be used to identify the worker to destroy.

It should be understood that the above examples are provided by way of illustration and that additional APIs may also be included, such as catalog APIs to update, delete, and/or retrieve a named catalog from the session cache, rules engine APIs to add, modify, remove, and/or retrieve facts from the session cache, etc.

The statuses 834 include data describing the state of the workers and/or the worker pool 836. A status 834 may be individualized to a particular worker, may describe each of the workers specifically or generally, may describe the overall state of the worker pool, a combination of the foregoing, etc. Examples of types of data that can be included in a status 834 may include the average session memory utilization, available worker capacity, amount worker capacity utilized, amount of free memory, total memory, average CPU load, the number of workers that are available, the number of workers assigned, the total number of workers, amount of memory being used by the workers (e.g., individually, total, etc.).

In some instances, the statuses 834 may include timestamps showing usage, capacity, and performance trends over time. The statuses 834 may be stored in the data store and retrievable by the other components of the configuration engine 726 (e.g., the worker pool 834, the APIs 832, etc.) for provision to the requestor. In some implementations, the worker pool 836 may generate a status 834 in response to receiving a status request (e.g., via a corresponding API). The status request may include various parameters, which may be used to generate the status 834. Upon generation, the status 834 may be stored in the data store 810 and/or provided to the requestor.

The worker pool 836 includes software, data, and/or logic for managing engine instances based on the client sessions. The worker pool 836 can select a worker from a worker pool and deploy it to initialize a new model. In some instances, the model may be initialized responsive to receiving a corresponding request from an API 832 or another element of the system 700. Each worker instance, when deployed, may be assigned a unique identifier (e.g., a pool number), which allows the worker pool 836 to distinguish between worker instances and route data to the correct model. If the worker pool 836 determines, based on a unique identifier, that no workers exist for a particular model, it can deploy a new worker, associate the worker a unique identifier that is also associated with the model, and initialize the model into the memory allocated to the worker. When deploying the worker to initialize the model, the worker pool 836 may create an in memory multi-dimensional indexed space, also referred to as a multi-dimensional map, which can be augmented with modeling data (e.g., prices, user segmentation attributes, etc.) received from the modeling engine 720.

The initialization step may create the in-memory multi-dimensional maps and can also augment the model with passed in values such as prices and user segmentation attributes. In some cases, since the model may be stored in-memory, any subsequent eval call can run a 'duff' (to determine the difference) between the passed in model and the in-memory model and only mark the difference as modified. Otherwise, everything may be marked as modified and the rules can be fired. The difference mechanism can support partial models to be passed in and any missing model parts may be assumed to be unchanged.

Figure 12:
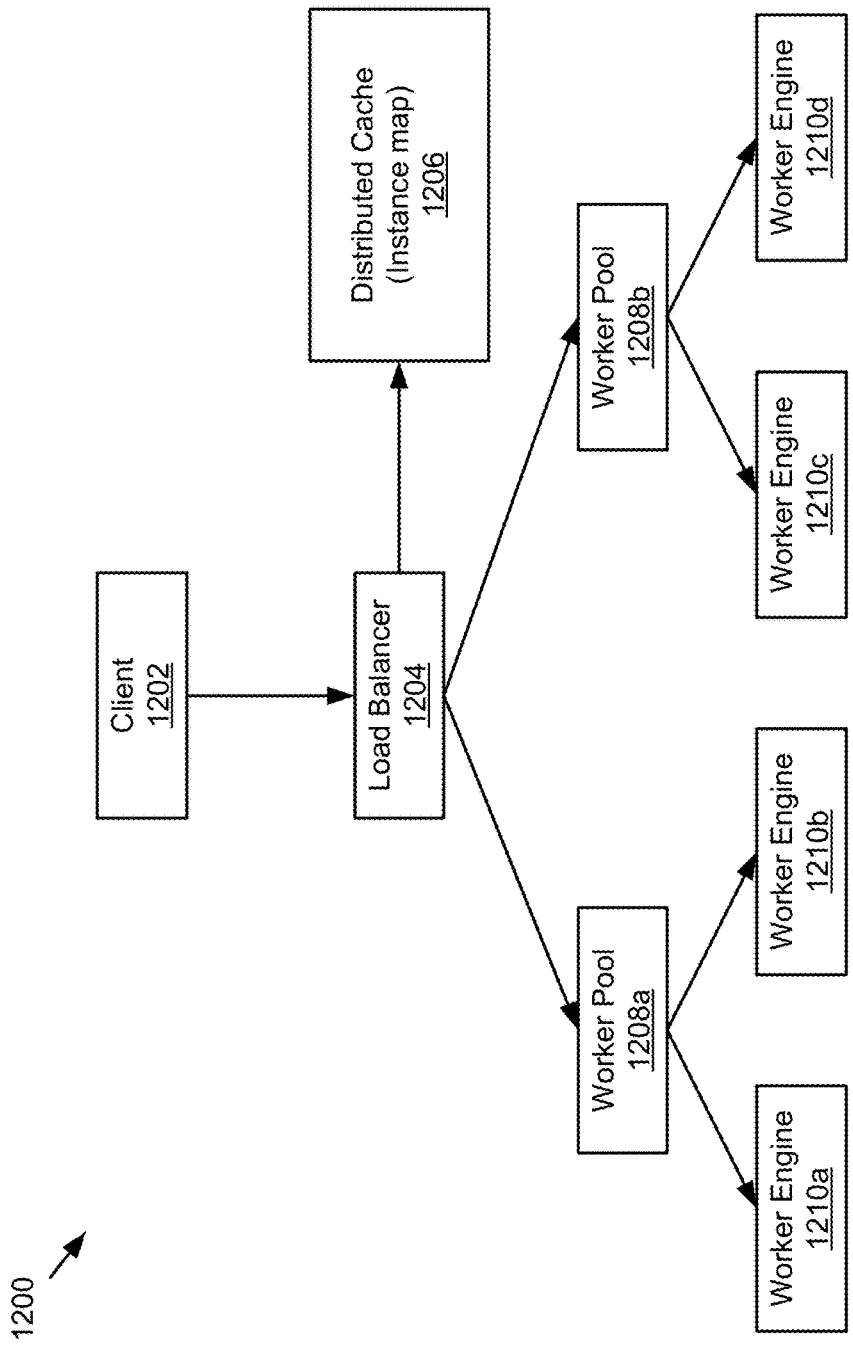
FIG. 12 is a method depicting an example client configuration session associated with a particular model.

As depicted by FIG. 12, which describes a further example of a configuration session, when a client/user 1202 begins a configuration session with a specific model, a new configuration engine 726 session may be created. The session request from the client may include the user session ID in the request header. Each configuration engine 726 session may fork a worker child process (e.g., worker engine instances 1210*a* . . . 1210*d*) that is managed by one or more instances of the worker pool 836 (e.g. worker pools 1208*a*-1208*b*). The user session ID may be used to correlate the user session with the worker that is doing the processing for the session. In some implementations, each worker pool 1208 may be managed by a load balancer 1204, which may monitor and distribute the workload across one or more worker pools 1208. Various workload distribution algorithms may be used, such as round-robin or least loaded. An instance map reflecting the distribution performed by the load balancer 1204 may be saved in a distributed cache 1206.

Returning to FIG. 8C, in implementations where memory is a gating factor for performance and update, the pool number may be based on the executing computing device's available memory. In some cases, the worker pool 836 estimates that each compiled model will require about 10 times its size in memory. For instance, an example 1 MB JSON model could be allocated 10 MB for its corresponding in-memory model.

The worker pool 836 is capable of reconstructing past modeling states associated with particular product configurations. For instance, a user may have ended a particular modeling session in the middle of a product configuration, upon which the modeling session was destroyed, and may now be returning to finish configuring that particular product. The worker pool 836 may retrieve the corresponding model from storage and reconstruct the modeling session. The worker pool 836 may also create new modeling sessions for new product configurations and may destroy modeling sessions, for example, responsive to a trigger. In some cases, the trigger may be explicit, such as a logout action, or can be implicit (e.g., programmatic). For example, the trigger may be activated if the session has been inactive for a certain period of time.

The worker pool 836 may be coupled to the APIs 832 to receive and send data, such as requests and responses. For instance, the worker pool 836 may receive requests for and send data describing worker pool status, model initialization and evaluation, modeling sessions, user authentication, etc.

The compiler 838 includes software and/or logic for compiling a non-compiled model into a compiled model. The non-compiled model may include various definitions, such as definitions for options group(s), rule(s), UI(s), result(s), error(s), etc.

The one or more option groups defined for a given model may include fact types and contain options. An option is part of the group and may include one or more attributes. The options may have various attributes, such as price, name, label, color, etc. In some implementations, there is no restriction as to the number of attributes allowed. A given rule may read the one or more attributes defined and set values of one or more other attributes. Each rule type may control various attributes. For example, a compatibility rule may control a specific "available" option attribute (e.g., _available). One or more compatibility rules can impact a specific '_available' attribute. Additionally, a given compatibility rule can include complex logic based on multiple sets of options of various groups.

In some implementations, an option may include fact tuples corresponding to each rule type. An example option group may be represented as:

```
UniqueGroupId : {
    "name": "name",
    "_required":true,
    "multiselect":false,
    "_visible":true,
```

```
            "showQty":false,
            "_quotable":false,
            ....
            options : [
                "_userSelected":false,
                "_available":true,
                "_errors":{ },
                "_selected":false
            ]
        }
```

As discussed herein at least with reference to FIGS. 1-6, the one or more rules defined for a given model include action logic for the model. The following is an example data representation of an un-compiled compatibility rule, which includes a data table listing the rule condition tuples:

```
{
    "type": "compatibility",
    "name": "Rule 1",
    "filters": [
        {"g": "groupA"},
        {"g": "groupB"},
        {"g": "groupC"}
    ],
    "data": {
        "default": true,
        "rows":[
            {
                "c": [
                    {"g": "groupA", "a": "attr1", "v": "value1"},
                    {"g": "groupB", "a": "attr2", "v": "value2"},
                    {"g": "groupC", "a": "attr2", "v": "value3"}
                ]
            },
            {
                "c": [
                    {"g": "groupA", "a": "attr1", "v": "value4"},
                    {"g": "groupB", "a": "attr2", "v": "value5"},
                    {"g": "groupC", "a": "attr2", "v": "value5"}
                ]
            },
            {
                "c": [
                    {"g": "groupA", "a": "attr1", "v": "value1"},
                    {"g": "groupB", "a": "attr2", "v": "value4"},
                    {"g": "groupC", "a": "attr2", "v": "value5"}
                ]
            }
        ]
    }
}
```

A UI definition for a given model may describe the UI layout and display. When evaluated by the rules engine 844, the one or more rules can be applied against the UI definition. An example UI definition may, for instance, include:

```
"UI" : {
    "version" : 1,
    "layout" : {
        "sections" : [
            {
                "name" : "Section Name A",
                "collapsed" : false,
                "groups" : [
                    "groupA",
                    "groupB"
                ]
            },
            {
                "name" : "Section Name B",
                "collapsed" : true,
```

```
                "groups" : [
                    "groupC",
                    "groupD"
                ]
            }
        ]
    }
}
```

A result definition may be determinative based on the logic included in the one or more rules. For example, one or more options may have a parked or reserve status until activated by applicable rule logic. By way of further example, the below result definition illustrates an example rule result where an option is added if the option has the quotable attribute equal to TRUE.

```
"result" : {
    "quotes" : {
        "groupA":{
            "option1" : true
        },
        "groupB":{ },
        "groupC":{ },
        "groupD":{ }
    }
}
```

The error definition may include a list of one or more errors that may be applicable to the model, as defined. In some implementations, the errors may correspond to the dimensions and/or variables used to configure the model. For example, errors may be defined in association with groups and options applicable to the model. The list of errors may serve as an index of errors that can allow a client to quickly identify errors without having to parse the whole model. The following is an example data representation of what an error definition could include:

```
"errors":{
    "values":[
        {"g":"groupA"},
        {"g":"groupB"},
        {"g":"groupC"}
    ]
}
```

Compiling a non-compiled model includes converting a model optimized for modelers (e.g., users) into a model optimized for evaluation by the rules engine 844. During compilation, the compiler 838 augments the model by creating memory objects holding data (e.g., compiled rules) that is interpretable and processable by the rules engine 844. For example, the compiled model can include compiled code that is non-structured and directly evaluable by the rules engine 844, although it should be understood that implementations using structured code are also possible and contemplated. In some cases, the compiled code could be written by an advanced user directly (e.g., using the raw rule type discussed in further detail elsewhere herein). For instance, a user may compose the rule directly via the modeling engine 720 using JavaScript.

During compilation of the model, the compiler 838 generates compiled rules from the non-compiled rules. The rules can be based on the rule definitions included in the model and created through an administrative UI. Rules can also be generated for handling errors and user selections, for managing selected quotable options, for determining option prices, etc. The compiler 838 can also create an indexed tree of conditions (e.g., hashed conditions 1116b as shown in FIG. 1116b) stored under the option groups.

In some implementations, a compiled rule may include one or more filters based on the rule associations discussed in further detail elsewhere herein. The filter(s) can determine what triggers the firing of the rule. In some implementations, a given filter may include one or more option groups and one or more expressions. The option group(s) may define what a given rule listens to, and the expressions may set forth the conditions that need to be satisfied for the rule to be executed. When compiling a rule, the compiler 838 may convert assignments (e.g., see FIG. 1, items 118 and 122) into filters, which can be used by the rules engine 844 to properly evaluate the rule. An assignment can assign a rule to one or more products, categories, and/or option groups, etc. Rule assignments are beneficial as they can make it intuitive for the user to define rules for configuring a product. In some cases where no explicit assignments are defined, the configuration engine 726 can infer the applicable filters from objects used in the action(s). It should be understood that assignments 110 and filters 114 may be different. Assignments may, in some cases, be optional but filters may not. If a rule has no assignments, filters may be inferred from objects used in the action and/or may be explicitly defined for the model.

Figure 11A:
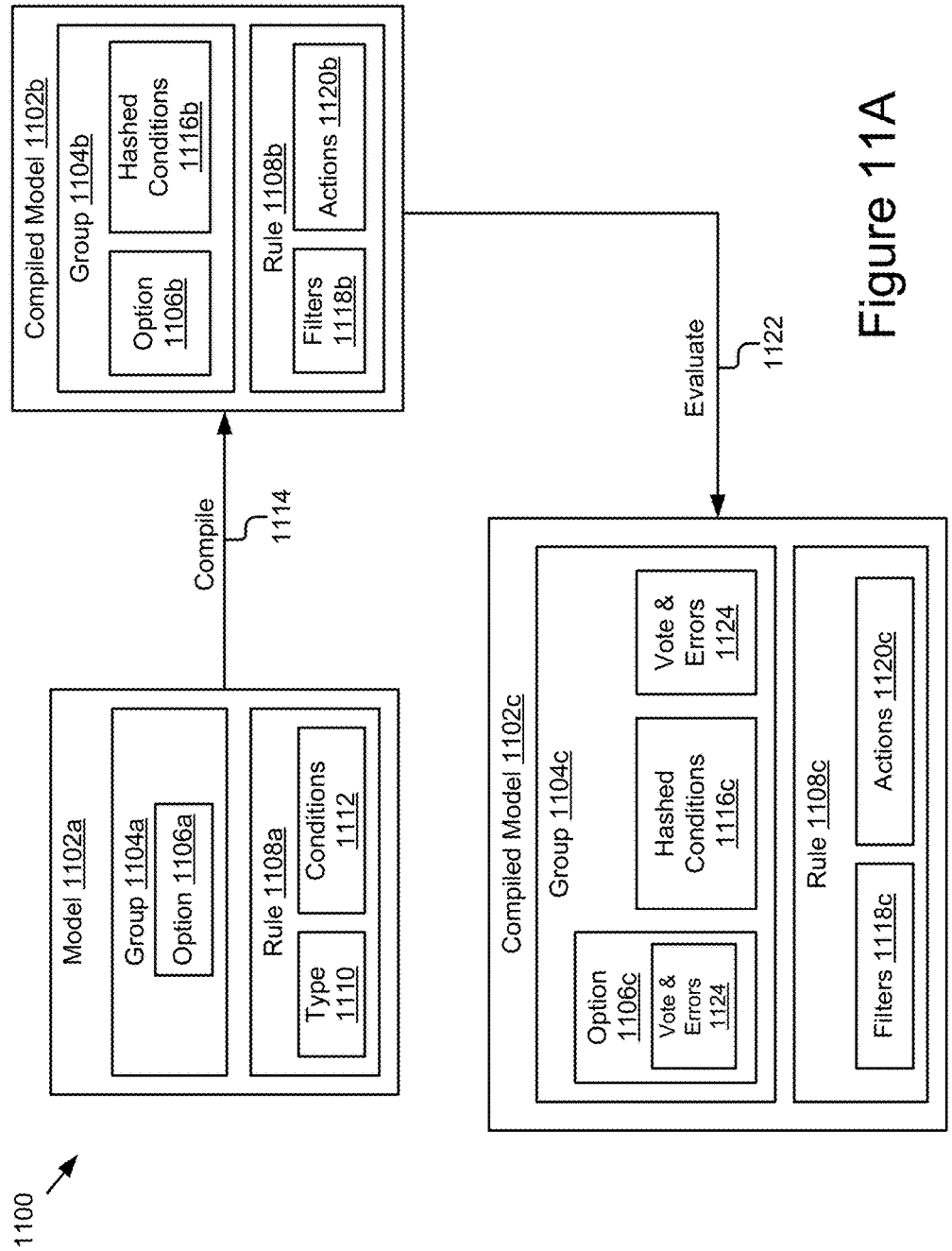
FIGS. 11A and B are diagrams illustrating example processes related to model compilation and evaluation.

By way of illustration, FIG. 11A is a block diagram illustrating an example method for model compilation and evaluation. As depicted, the method 1100 includes an example model 1102a. The model 1102a includes an option group 1104a and a rule 1108a. The option group 1104a includes an option 1106a and the rule 1108a includes its type 1110 and one or more rule conditions 1112. The model 1102a may be compiled 1114 by the compiler 838 into a compiled model 1102b, which may convert the model from a model optimized for modelers (users) into a compiled model optimized for evaluation by the configuration engine 726. The compiled model 1102b includes a group 1104b with option 1106b, which respectively correspond to the group 1104a and option 1106a; hashed conditions 1116b, and a compiled rule 1108b with filters 1118b and actions 1120b.

The compiled model 1102b may then be evaluated 1122 by the rules engine 844, which interprets the rules 1108b in association with the group 1104b, and generates an output 1124 including votes and/or errors 1124, which may be stored by the rules engine 844 in the evaluated model 1102c in association with the group 1104c and/or option 1106c objects to which they correspond. The evaluated model 1102c may include the hashed conditions 1116c, the rule 1108c, the filters 1118c, and the actions 1120c, which respectively correspond to the hashed conditions 1116b, rule 1108b, filters 1118b, and actions 1120b. As a product is configured based on the model, addition information may be injected into the model and re-evaluated as discussed elsewhere herein.

Figure 11B:
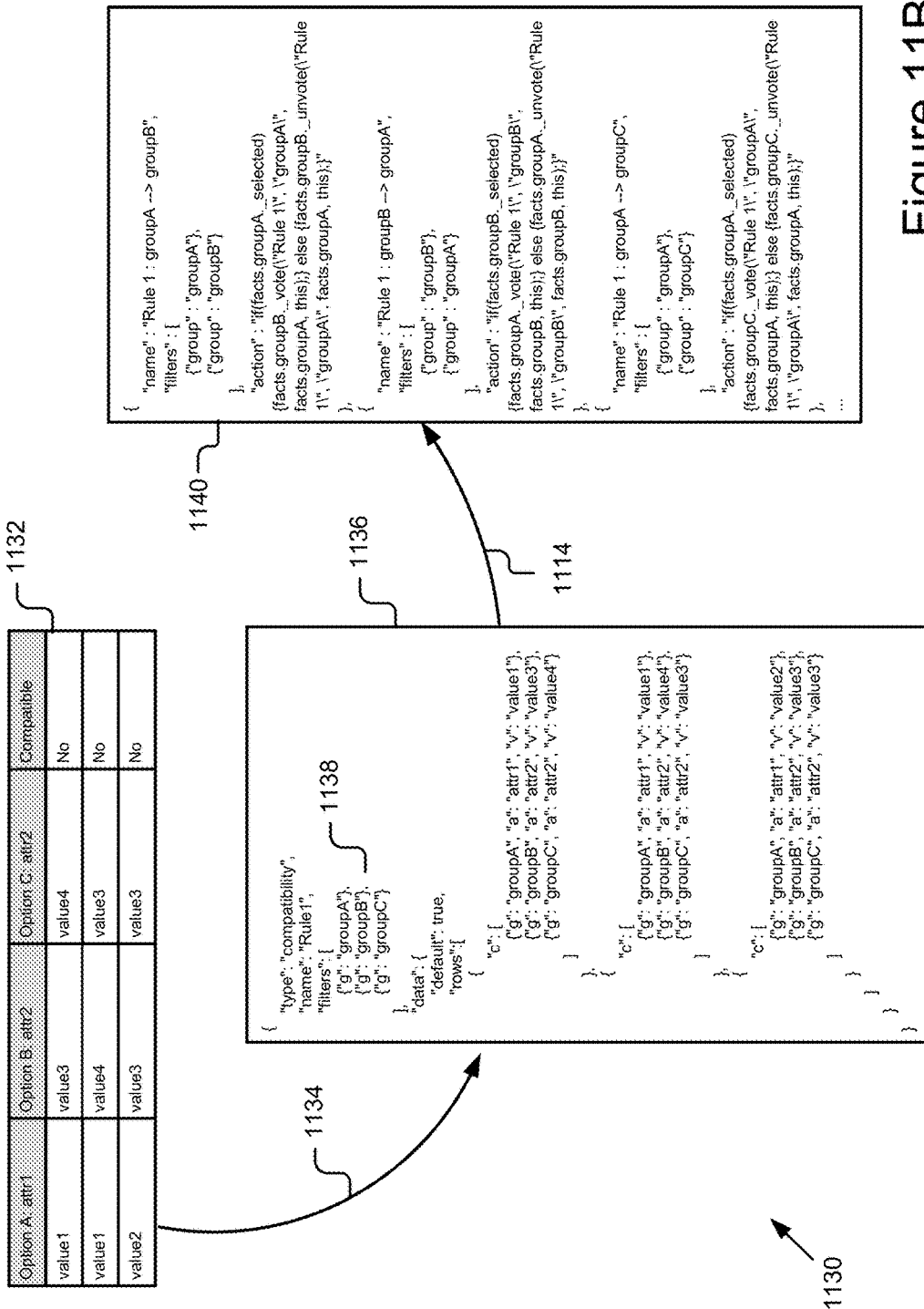

As a further example, FIG. 11B depicts a transformation process 1130 showing the transformation of a rule composed using a rule table to a compiled rule. In particular, table 1132 includes a compatibility rule definition with a rule having three attribute-related dimensions and a compatibility action. The modeling engine 720 can produce 1134 a JSON representation 1136 of the table rule and provide it to the configuration engine 720 along with a compile request. In response, the configuration engine 726 may compile 1114 the rule by generating a set of corresponding compiled rules 1140. The number of compiled rules may be filter dependent. In some implementations, the number of compiled rules=N (N−1), where N is the number of defined filters. In this example, the set 1140 includes 6 compiled rules 3(3−1), which are unique permutations of the defined filters 1138. In some implementations, the compilation step 1114 may include compiling the JSON representation 1136 into one or more rule objects (e.g., JavaScript objects).

In some implementations, the compiler 838 may, during compilation, augment an option group and its option objects with a tree of the conditions, as illustrated by the following example. Given the rule sample shown in FIG. 11B that includes three option groups (GroupA, GroupB, and GroupC), the following illustrates how GroupA (shown below in its pre-compiled form) could be augmented:

```
Pre compilation:
"groupA" : {
    "required" : true,
    "multiselect" : false,
    "visible" : true,
    "options" : [
        { "attr1" : "value1" },
        { "attr1" : "value2" }
    ]
}
Post compilation:
"groupA" : {
    ...
    , "_compatibilityMapping" : {
        "Rule1" : {
            "default" : true,
            "conditionsSet" : {
                "attr1 ": [
                    {
                        "v":"value1",
                        "c":[
                            {
                                "g":"groupB",
                                "a":"attr2",
                                "v":"value2",
                                "c":"groupC.attr2.value4"
                            },
                            {
                                "g":"groupB",
                                "a":"attr2",
                                "v":"value4",
                                "c":"groupC.attr2.value3"
                            }
                        ]
                    },
                    {
                        "v":"value2",
                        "c":[
                            ...
                        ]
                    }
                ]
            }
        }
    }
}
```

Note that, in the above example, the rule conditions are indexed in a tree under the group so that during the evaluation, the logic can just traverse the tree based on its current state. For the compatibility rule used for the above example, the state of the system used is the value of the '_selected' attribute.

Returning back to FIG. 8C, the rule types logic 840 include includes software and/or logic for compiling the different types of rules supported by the configuration engine 726. Examples rules may include, but are not limited to compatibility, auto-select, visibility, required, price discount, raw, etc. The logic for each rule type may be embodied as a function stored in the data store 810. The logic may include compile logic and action logic. The compile logic may be configured to interpret a corresponding data table defined by a user for that type of rule and convert it into one or more rules that can be evaluated by the rules engine 844. The action logic may be one or more actions executed by the rules engine 844 during evaluation of the model. The rule types logic 840 may leverage voting APIs, which are discussed in further detail elsewhere herein.

During compilation, the compiler 838 may create a set of one or more rules to manage various errors for the model. Table 1 below depicts some example error rules that may be created.

TABLE 1

Example Error Rules

| Rule Name | Description |
| --- | --- |
| MULTIPLE_SELECTIONS_IN_SINGLE_SELECT | May be fired when multiple options are selected from an option group marked as single select. This can happen when an auto-select rule selects an option from a single-select option group. In some cases, the system may not remove a user-selected option. |
| REQUIRED_BUT_UNAVAILABLE | May be fired when a required option group has each option marked as unavailable. |
| SELECTED_BUT_UNAVAILABLE | May be fired when an option is selected but marked as unavailable. |
| SELECTED_BUT_INVISIBLE | May be fired when an option of an invisible group is user selected. This error may never occur since user selected options are removed when a group becomes invisible. |
| REQUIRED | May be fired when a required group has no options selected. |

In some implementations, compilation of the model definition may automatically create a fact called errors to store all the errors associated with the model. The error fact may be used as a mechanism of tracking all errors thrown for a model without having to loop over items (e.g., options) defining the model to see if any errors exist. When surfaced, an error may be stored in the fact in association with the item (e.g., option group, option, attributed, etc.) to which it corresponds. The following example an _addError(error) and _removeError(error) methods may be used provide a centralized way of managing errors:

```
object._addError = function(ruleName, errorType, globalErrors) {
   var validation = ValidationsMapping[errorType];
   if(!validation) {
      throw new Error("Validation type ["+errorType+"] is not registered. Please Register it first.");
   }
   validation.addError(ruleName, globalErrors, groupName, this);
}
object._removeError = function(ruleName, errorType, globalErrors) {
   var validation = ValidationsMapping[errorType];
   if(!validation) {
      throw new Error("Validation type ["+errorType+"] is not registered. Please Register it first.");
   }
   validation.removeError(ruleName, globalErrors, groupName, this);
}
```

The compiler 838 may include a version management mechanism to track changes to a given model. In some implementations, version numbers reflecting the version level may be used, and incremented if, a backward incompatible change is made. A given version number may be used in various places, including in the model metadata and the UI definition. In some cases, the model may be annotated with the version number, which may then be read and used by the rules engine 844 to determine whether the current or legacy version of the rules engine 844 logic should be used to evaluate the model. The rendering logic of the modeling engine 720 may also rely on the version number to support backward incompatible changes. In some implementations, the version number is set by the modeling engine 720 and included in the model definition when provided to the configuration engine 726.

The voting mechanism 842 includes software and/or logic for efficiently resolving conflicts in a model during rule evaluation using voting. The voting mechanism 842 may be coupled to the rules engine 844 to send and receive the vote-related information. For a given model being evaluated by the rules engine 844, the voting mechanism can receive, track, and resolve the attribute value votes cast by a rule. The voting mechanism 842 may be accessed by, and configured to receive and send data from and to, the rules engine 844 and/or the other components of the configuration engine 726 via APIs 832, such as vote( ) and unvote( ). In some implementations, each rule type may include logic 840 for executing the APIs when evaluated by the rules engine 844. For example, an action in a compiled rule of model may call the _vote( ) and/or _unvote( ) APIs when executed.

When evaluated by the rules engine 844, the action of a rule may be configured to vote for (e.g., set) the value of an attribute. An attribute may be tied to one or more rule dimensions and/or dimension levels, including groups, options, a combination of the foregoing, etc. In addition, the value of an attribute may be determined differently based on rule type. For example, a compatibility rule may set the value of an 'available' flag for an option while a visibility rule may set a value of a 'visible' flag for an option group.

The voting mechanism 842 may annotate the model with reasons that describe why a given attribute is assigned a particular value. The voting mechanism 842 may store and manage reasons using corresponding objects. A reasons object may be used by the conflict resolution logic to resolve conflicts between rules of a model during evaluation. The reasons objects may be indexed by the attribute name. A given reason object may contain the one or more rule conditions (e.g., rows) that triggered (e.g., voted for) the setting of the attribute value. For example, a reason object may be associated with an option or an option group, and the voting mechanism 842 may annotate the reasons object whenever a condition is met towards the attribute value voted for by the option or option group.

In some implementations, during voting, the voting mechanism 842 may process voter and vote objects for a given rule. Voters may be a set of one or more groups, options, attributes, etc., included in a given rule condition that determines an action. The action may be responsible for casting a vote for a particular attribute value based on the rule condition. A vote object may be the output of the rule action. By way of example, a compatibility vote object could include a boolean value representing the value of an _available flag value that the rule is configured to set. In a further example, for a rebate rule, the vote object could include a rebate type (%, unit of measure, etc.) and an amount. In some implementations, voters and vote objects may be stored using fact tuples (e.g., options).

The voting mechanism 842 may aggregate the votes cast for an attribute and resolve the value for that attribute. In some implementation, the resolution of the votes may be performed differently based on rule type. For example, the vote aggregator may resolve the votes of a compatibility rule that requires an option group or option would be available only if all rules vote to make it available. For instance, via the voting mechanism 842, a rebate rule may perform the resolution by computing the total rebate across all votes, during which a corresponding reasons objects may be set. An example of an object including voting-related information may be represented as:

```
"options" : [
    {
        "_userSelected" : false,
        "_selected" : false,
        "_available" : true,
        "_errors" : {
        },
        "_availability" : {
            "rulesDecisions" : {
                "RuleA" : true, "RuleB" : false
            },
            "votes" : {
                "RuleA" : {
                    _available = true
                }
            },
            "voters" : {
                "groupB" : [
                ],
                "groupC" : [
                ]
            }
        }
    }
]
```

By leveraging the voting mechanism 842, the rule engine 844 can yield better performance (e.g., faster response times) than other solutions. It can also track which option(s) are actually responsible for a given attribute value, which can be used by an end user to determine understand how the value was set and/or let an admin user debug the model at runtime. In addition, by using the APIs and refactoring the voting mechanism into a separate module (e.g., an abstract base class), developer users can easily create rules without needing deep knowledge about the inner workings of the configuration engine; and it can reduce backward compatibility issues by reducing and/or eliminating the complex code from the model definition.

The rules engine 844 includes software and/or logic for efficiently evaluating the rules of a model. Evaluation may be triggered by a change in the state of a model, as discussed in further detail herein. During evaluation, the rules engine 844 can iterate through the option permutations based on a set of rules and an in-memory model, which may include facts and tuples. The Rules Engine 844 may manage facts associated with an in-memory model. Example APIs that may be exposed by the rules engine 844 may include insert(fact), remove(fact), and modify (fact). Insert(fact) may be called to add a fact and remove(fact) may be called to remove a fact from an in-memory model. Modify(fact) may place the fact in active memory.

In some implementations, the rules engine 844 may evaluate a model using a modified RETE algorithm. Using this algorithm, the rules engine 844 may determine all the rules tied to options in the active memory, remove duplicates, and loop over the rules to evaluate them. In some implementations, the rules engine 844 may sort the rules to be evaluated based on a predetermined priority before evaluation.

In some cases, evaluation may be triggered by calling a run method. The run method can be called by another component of the configuration engine 726, or may be self-triggered by the run method itself in some cases, for instance, where the active memory has been modified. This can happen, for example, if a rule changes the value of a given attribute, which can result in the execution of one or more other associated rules. The rules engine 844 may detect potential infinite loops caused by circular chaining of rules and attributes, and break out of those loops based on one or more criteria, including, for example the number of times a given rule and/or attribute has been re-evaluated. An example run method may be represented by the following code snippet:

```
self.run = function(callback) {
    for(var activeRuleType in activeRuleTypes) {
        var rulesIds = typesToRulesMapping[activeRuleType]
        if(rulesIds) {
            for(var i = 0 ; i < rulesIds.length ; i++) {
                rulesToRun[rulesIds[i]] = true      // compile unique rule
                                                    list
            }
        }
    }
    // run the rules
    for(var ruleId in rulesToRun) {
        runRule(rules[ruleId])                       // evaluate the rules
    }
    if(modified) {
        setImmediate(function( ) {
            self.run(callback)                       // rerun the session if it
                                                     has been modified
        })
    } else if(callback) {
        setImmediate(callback)
    }
}
```

The rules engine 844 may be configured to iterate over all the facts tied to a given rule, and recursively iterate over all of the tuples associated with the rule. This allows the rules engine 844 to evaluate tuples across multiple products (e.g., two or more) that may be associated with the rule. This is advantageous as it can identify and evaluate various different permutations of tuples that can occur. In some cases, after all of the facts for a give rule have been determined, the rules engine 844 may evaluate the rule based on the facts. In some implementations, these acts and/or functionality may be embodied in the follow example runRule method.

```
var runRule =function(rule) {
    runTypes(rule, { }, rule.getTypes( ), 0)
}
var runTypes = function(rule, facts, types, typeIndex) {
```

```
    if(typeIndex < types.length) {
        var type = types[typeIndex]          // get the facts tied to
the rule type
            typeIndex ++
        var typeFactList = allTypes[type]    // get the tuples of
                                             that fact
        for(var i = 0 ; i < typeFactList.length ; i++) {
            facts[type] = typeFactList[i]
            runTypes(rule, facts, types, typeIndex)  // recursively loop over
the facts
        }
    } else {
        rule.run(facts, self, context)       // eval the rule logic
    }
}
```

The rules engine 844 may output result data describing the evaluated model to the modeling engine 720 for review by the user. In some cases, the result data may indicate whether the model configuration and/or changes thereto were valid, and an indication of such may be presented to the user. In some cases, the output may include error data indicating one or more errors in the model, which may be presented to the user for configuration. In some cases, the output may indicate a conflict between two or more rules, two or more dimensions of a rule, etc., and may suggest to the user how to resolve the conflict, to simplify the configuration process for the user. An example of result data output by the rules engine 844 may include one or more of errors, quotes, a bill of materials, item quantities, prices, a voting summary, etc.

FIG. 8D depicts interaction between an example modeling engine 720 and configuration engine 726. As depicted, the configuration service may be split into two parts, a stateless global cache 852 and stateful session cache 876. The stateless global cache may be configured to push and fetch the model 894, the catalog 862, and the external data 864 to and from one or more information sources, such as the data store 810. The stateful session cache 876 may be configured to evaluate the model 894, keep track of the user selections and the 'available' selections, and return a result 884 and a UI definition 882 with the state of the model. The stateful session cache 876 (session) may be created and the rules engine 844 initialized, during which the model 894 may be compiled by the compiler 838 into an object structure that the rules engine 844 can interpret and/or process.

As depicted in FIG. 8D, the stateless session cache 852 may store data related to a model 894 including, for example, option groups 854, catalog reference 856, rules 858, a UI definition 860, etc., a catalog 862, and external data including, for example, user info 866, price lists 868, customers 870, and other external data 872, etc. The catalog 862 may include a list of attributes and their values, the list of categories and their parents, and the list of products. In some cases, the object structures such as the model 894, the catalog 862, and the external data 864, may be cached on modeling engine 720 side, but not persisted for performance, although other configurations are possible where the objects are persisted and restorable upon restart. The data describing the option groups 854, catalog 862, user info 866, price lists 868, customers 870, etc., may be received from the modeling engine 720 by the configuration engine 726 and used by it to create corresponding facts 878 during the initialization phase. For example, facts 878 may be created from option groups 854 included in the rules of the model 894 and/or corresponding information from the catalog 862. The rules 858 may be compiled and stored as rules 880 and the UI definitions 882 may be interpreted and stored in as UI definitions 882. The modeling engine 720 may access various functionality, acts, and/or data provided by the configuration engine 726 using APIs 832 exposed by the configuration engine 726, and other applications may access various functionality, acts, and/or data provided by the modeling engine 720 via APIs 850 exposed by the modeling engine 720.

In some implementations, the rules 858 and the UI definition 860 can be copied from the modeling engine 720 side to the configuration engine 726 side as represented by solid lines 888; the catalog 862, the user info 866, the price lists 868, and the other external data 872 can be merged together to produce corresponding facts 878 on the configuration engine 726 side as represented by dashed lines 890; and one or more facts 878 can be selected and processed to produce the result 884 as represented by the curved line 892.

Figure 9:
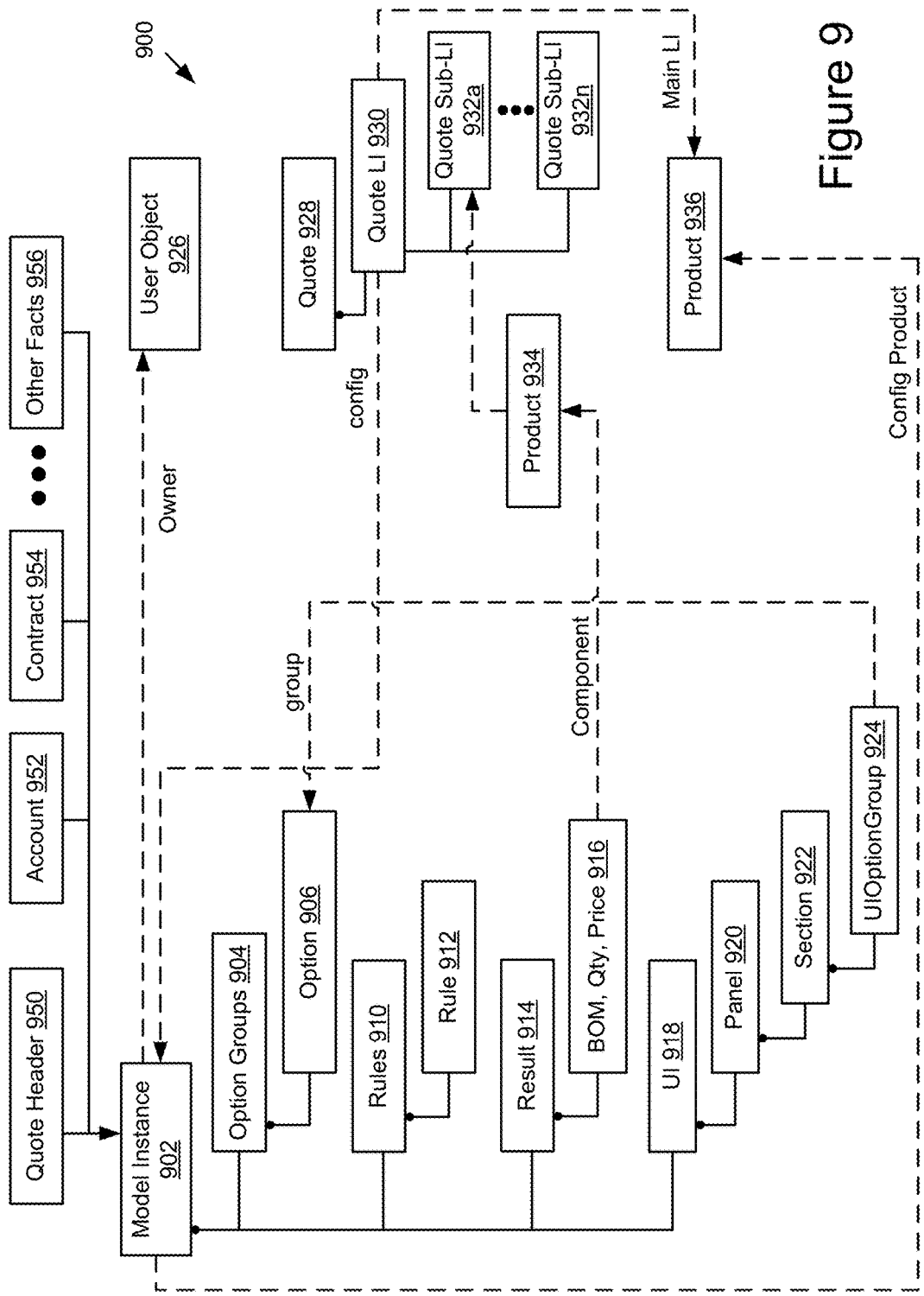
FIG. 9 is a block diagram illustrating the generation of an example model instance.

FIG. 9 is a block diagram illustrating the generation of an example model instance. As depicted, the model instance 902 (e.g., an object model 826) may be based on one or more sets of data including a quote header 950, an account 952, a contract 954, and/or other facts 956. This data may be received from one or more information sources, including, for example, the data store 810, a user device 706, a third-party server (not shown), etc., and injected into the model instance 902 (e.g., by the object model management engine 824). A user may create and develop a model instance 902 using corresponding user interfaces presented to the user via the user application 708. The model instance 902 may be associated with the user object 926 of the user (e.g., owner, creator, etc.), which allows the user to store the model instance 902 in association with the user object 926 for later use.

The model instance 902 may include various sets of data including option groups 904, rules 910, a result 914, and a UI 918, depending on what stage the model is in. Each option group may include one or more options 906. The rules 910 may include one or more rules 912 input by the user using a table-based format and/or autonomously generated by the modeling engine 720 and/or configuration engine 726. The result 914 may include a bill of materials, item quantities, price, errors, etc., determined in association with the product 936 being configured. In some implementations, the result 914 may be generated based on the quote 928, and the quote 928 may be generated based on the configuration of the model instance 902. The quote 928 may be itemized into one or more quote line items 930. Each quote line item 930 may correspond to a main item of the product 936 and may include one or more sub-line items 932a . . . 932n corresponding to the components comprising that aspect of the product 934. For example, a quote line item 930 may correspond to a computer being configured by the user and the sub-line items 932a . . . 932n may correspond to the components of the computer, such as a processor, memory, etc.

The UI 918 may include one or more interface components for configuring the model instance 902, including one or more panels 920. The panel 920 may include a section 922 containing a UIOptionGroup 924 providing a group of options for selection and application to the model by the user. The UIOptionGroup 924 may correspond to the one or more options 906 included in the option groups 904.

Figure 10:
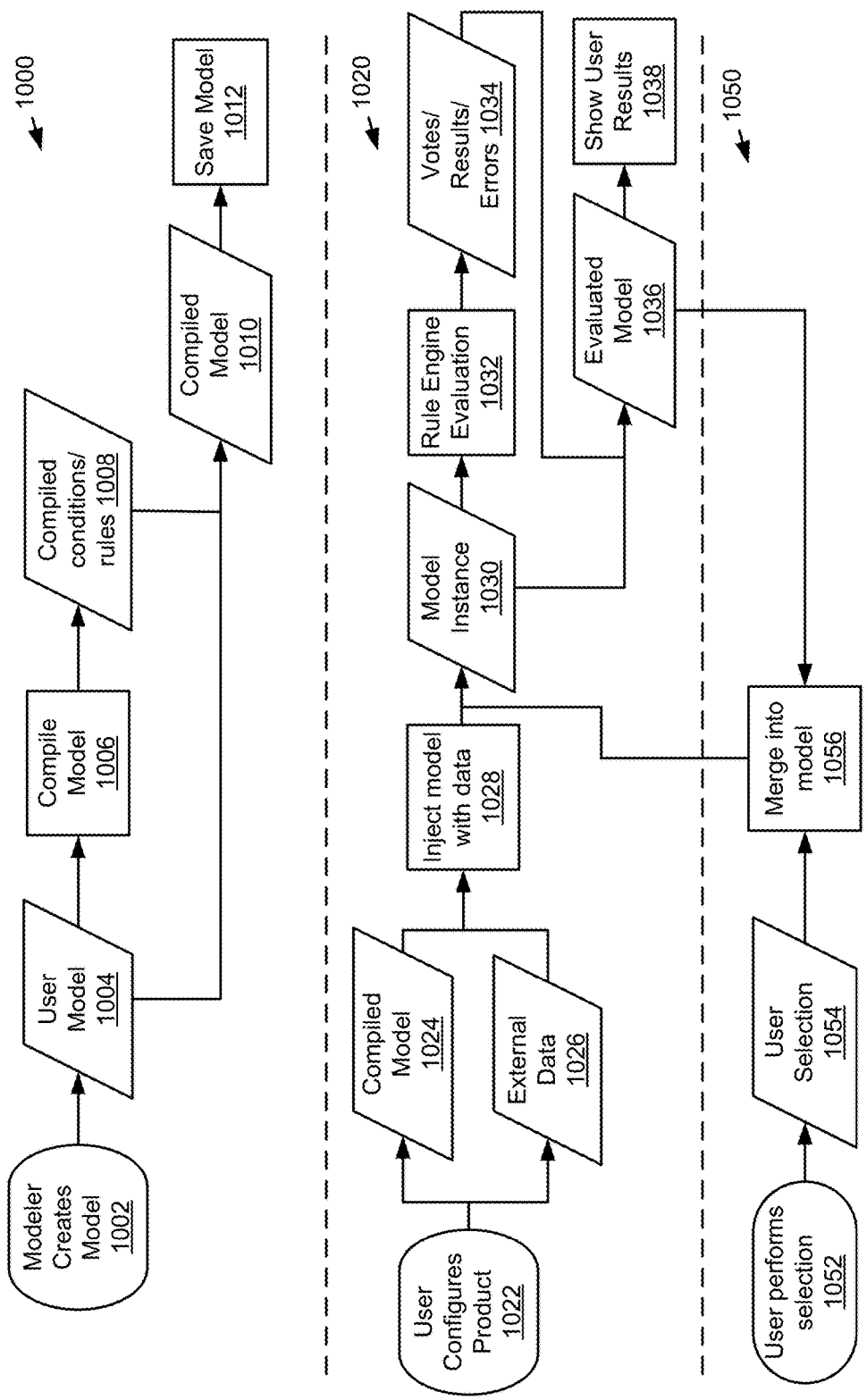
FIG. 10 is a block diagram illustrating an overall process for model creation, compilation, evaluation, product configuration, and user selection.

FIG. 10 is a block diagram illustrating various processes for model creation, compilation, evaluation, product configuration, and user selection. In process 1000, a modeler can create 1002 a model by inputting information into the modeling engine 720, for example, via a user interface generated and displayed by the UI engine 820. The modeling engine 720 may create a model 1004 for the user based on this input and may send the model to the configuration engine 726, which may compile 1006 the model into compiled conditions/rules 1008. The compiled model 1010 and then be saved 1012 in storage, for example in the memory 804 and/or the data store 810.

In process 1020, a user may configure a product via the modeling engine 720. The product configuration may utilize the compiled model 1010 and external data 1026 by injecting the compiled model 1010 with various requirements (e.g., user, customer, etc.) reflecting how the product should be configured. The configuration engine 726 may initialize a model instance 1030 based on the compiled model 1010 and the rules engine 844 may evaluate the compiled model and produce and output 1034 including one or more of votes, rules, and errors. The configuration engine 726 may incorporate the output 1034 into an evaluated model 1036 and provide 1038 results associated with the evaluated model 1036 to the modeling engine 720 for provision and display to the user.

In process 1050, the user may perform a selection associated with the product configuration. The modeling engine 720 may receive the user selection 1054 and provide it to the configuration engine 726 and the configuration engine 726 may merge 1056 the user selection into the evaluated model 1036. The rules engine 1032 may then re-evaluate the evaluated model 1036, which incorporates the user selection. The output from the evaluation may then be provided again to the user and the cycle may repeat until the product is fully configured. It should be understood that the above processes 1000, 1020, and 1050 are provided by way of example, and numerous other variations of these processes and/or portions thereof are contemplated and encompassed by the scope of this disclosure. Further, it should be understood that these processes 1000, 1020, and 1050 and/or portions thereof may be iterated one or many times to produce the data necessary to fully model and/or configure a product.

Figure 13:
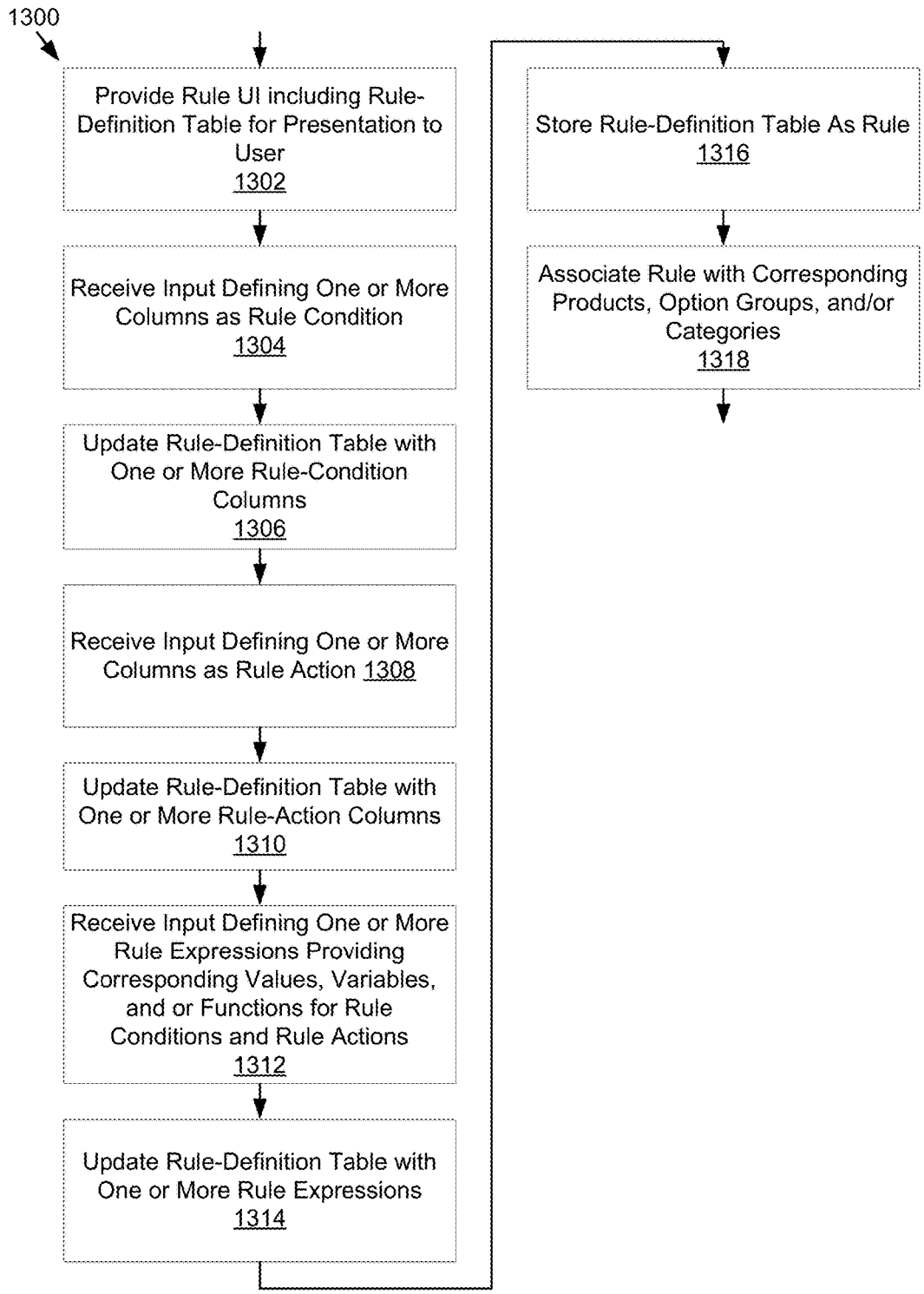
FIG. 13 is a flowchart of an example method for rule creation and association with a model.

FIG. 13 is a flowchart of an example method for creating and associating a rule with a model. The method 1300 may begin by providing 1302 rule UI including rule-definition table for presentation to user, which the user may use to conveniently define the rules for a model. The method 1300 may receive 1304 input defining one or more columns as rule condition and may update 1306 rule-definition table with one or more rule-condition columns. The method 1300 may receive 1308 input defining one or more columns as rule action 1308 and may update 1310 rule-definition table with one or more rule-action columns. Next, the method 1300 may receive 1312 input defining one or more rule expressions providing corresponding values, variables, and/or functions for the rule conditions and rule actions. The method 1300 may then update 1314 rule-definition table with one or more rule expressions. The method 1300 may continue by storing 1316 rule-definition table as rule. For example, the method 1300 may store 1316 the rule definition table as the rule in a table-based format. The method 1300 may then associate 1318 rule with corresponding products, option groups, and/or categories.

Figure 14A:
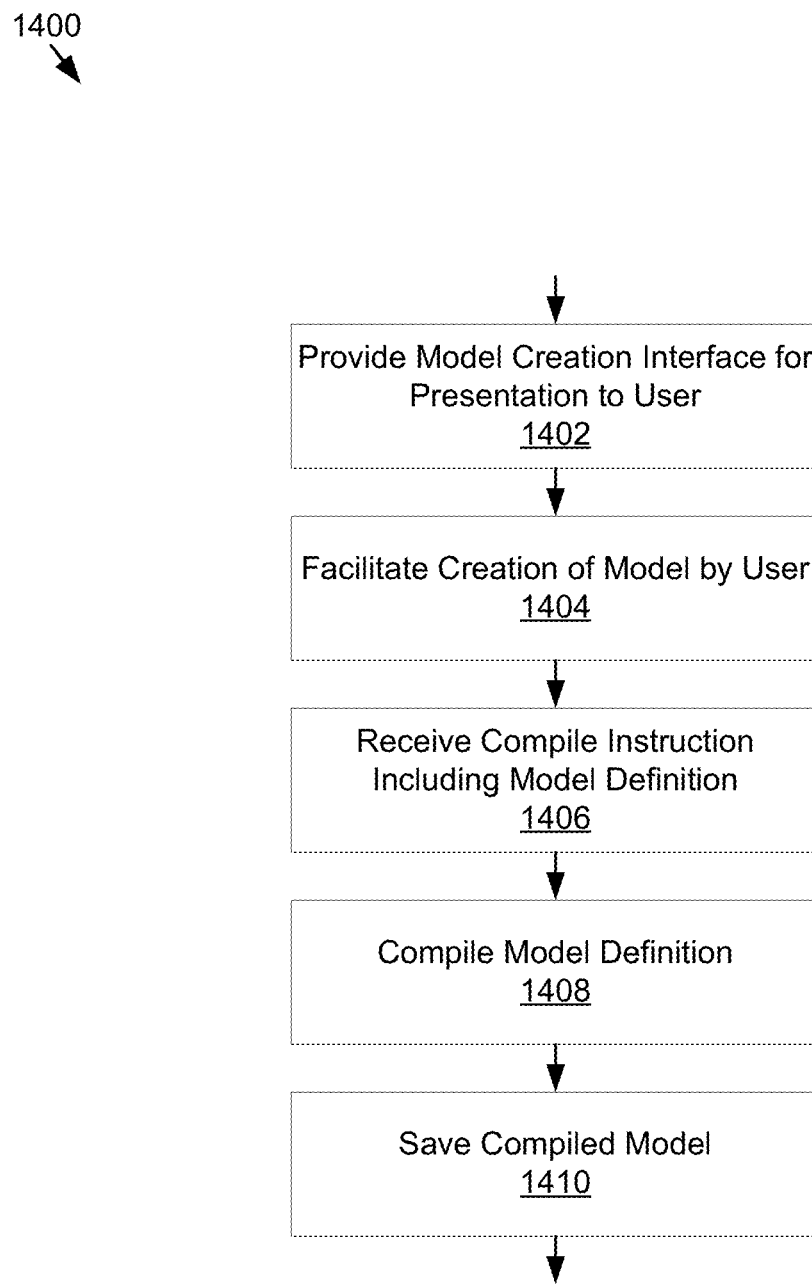
FIG. 14A is a flowchart of an example method for model creation and compilation.

FIG. 14A is a flowchart of an example method 1400 for creating and compiling a model. In block 1400, the method may provide 1402 a model creation interface for presentation to user to facilitate 1404 creation of model by user. In response, the method 1400 may receive 1406 compile instruction including model definition and may compile 1408 the model definition. The method may then save 1410 the compiled model in storage, such as the memory 804 and/or the storage 810.

Figure 14B:
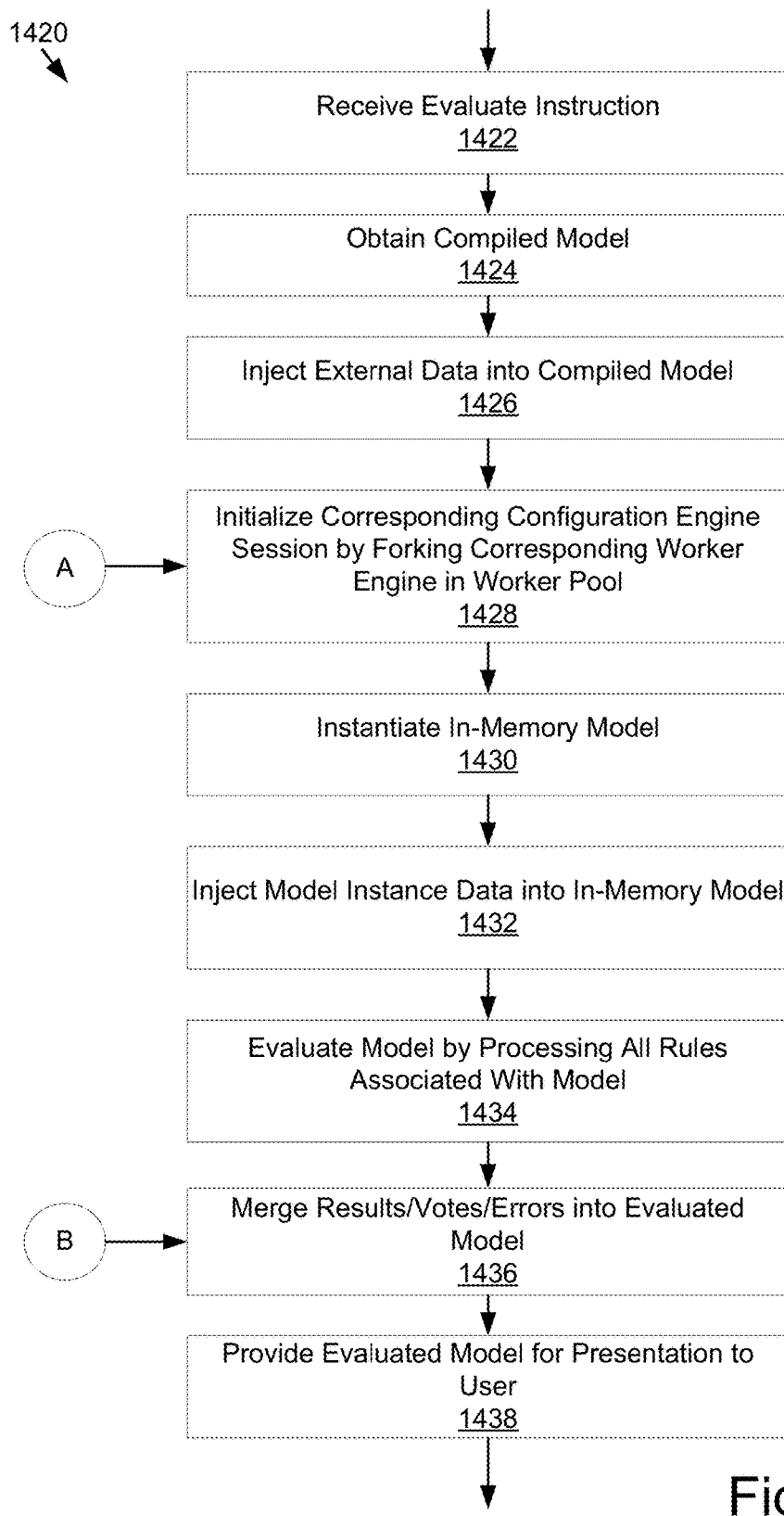
FIG. 14B is a flowchart of an example method for model evaluation and presentation to a user.

FIG. 14B is a flowchart of an example method for evaluating a model. In block 1420, the method may receive 1422 an evaluate instruction instructing the configuration engine 720 to evaluate a given model. In response, the method 1420 may obtain 1424 a corresponding compiled model. In some implementations, the rules engine 844 may receive an evaluate request that includes a reference to the compiled model, and the rules engine 844 may obtain the compiled model from memory based thereon. Next, the method 1420 may proceed inject 1426 data into the compiled model reflecting the configuration requirements of a user. For example, the data may include external data.

The method 1420 may continue by initializing 1428 a configuration engine session by forking corresponding worker engine in the worker pool, instantiating 1430 an in-memory model, and then injecting 1432 the model instance data into in-memory model. Next, the rules engine 844 may evaluate 1434 the model by processing the rules associated with model and determining an output including one or more results, votes, and/or errors. The method 1420 may merge the output with the compiled model to produce an evaluated model and may provide 1438 data describing the evaluated model for presentation to user.

Figure 14C:
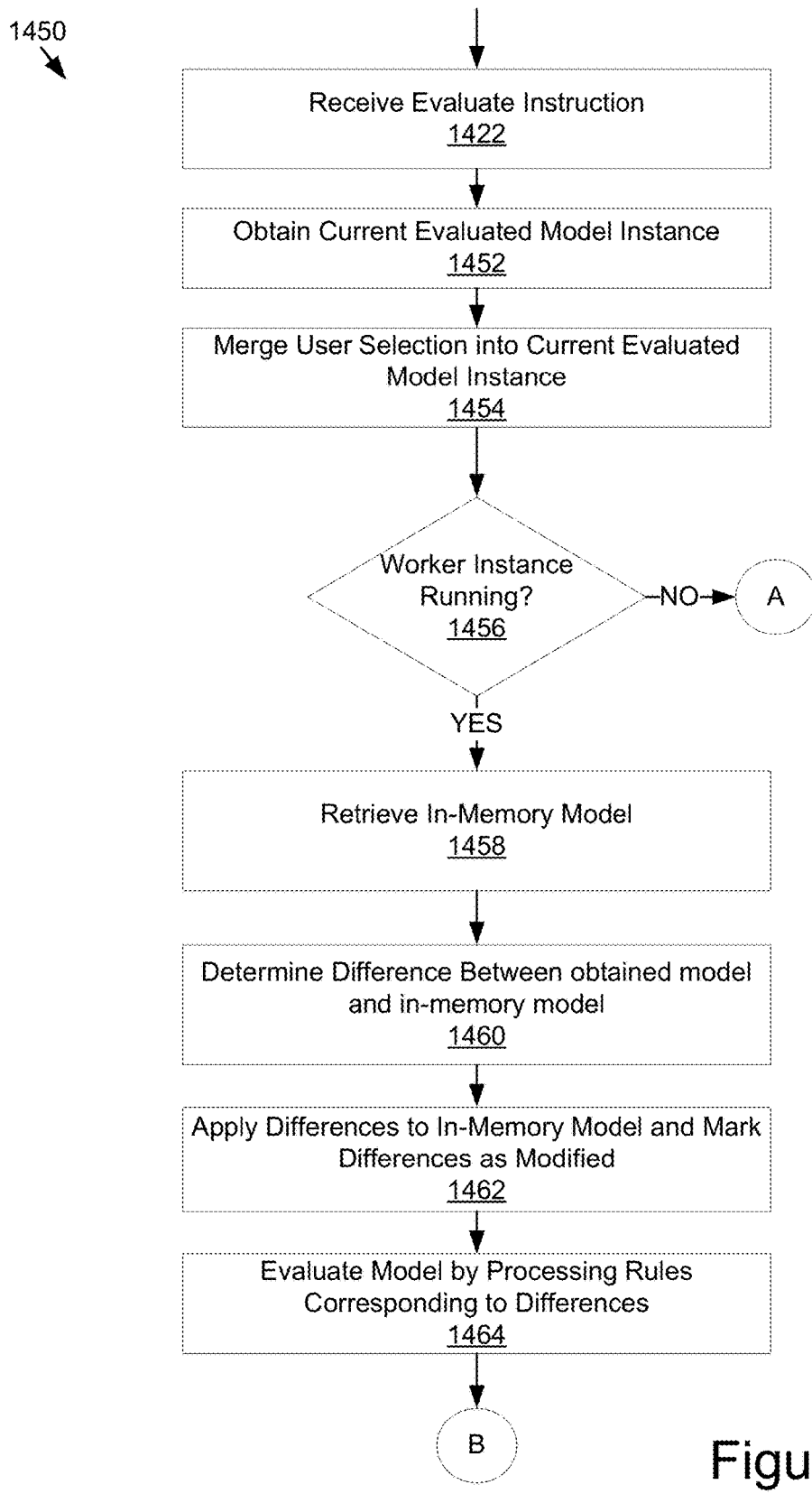
FIG. 14C is a flowchart of another example method for model evaluation and presentation to a user.

FIG. 14C is a flowchart of an example method for (re)evaluating a model. In block 1422, the method 1450 may receive 1422 an evaluate instruction instructing the configuration engine 726 to re-evaluate a given model. The evaluate instruction may be associated with a user selection for configuring a product based on the model. The method 1420 may obtain 1424 an instance of a corresponding previously evaluated model and may merge 1454 the user selection into the instance of the previously evaluated model. The method 1450 may then determine in block 1456 whether a corresponding worker instance is running. If the result is negative, then the method 1450 may proceed to block 1428 (see FIG. 14B). If the result is affirmative, then the method 1450 may retrieve 1458 the in-memory model and determine 1460 difference between the merged model and in-memory model by comparing them. The method 1450 may then apply 1462 any differences to the in-memory model and mark differences as modified (e.g., by setting a corresponding flag). Next, the method 1450 may efficiently evaluate 1464 the model by processing rules corresponding to differences. The method 1450 may then continue on to block 1436 (see FIG. 14B) and merge the output implementation of the evaluation (e.g., results, votes, errors, etc.) into evaluated model and provide 1438 data describing the output and/or the evaluated model for presentation to user.

Figure 15:
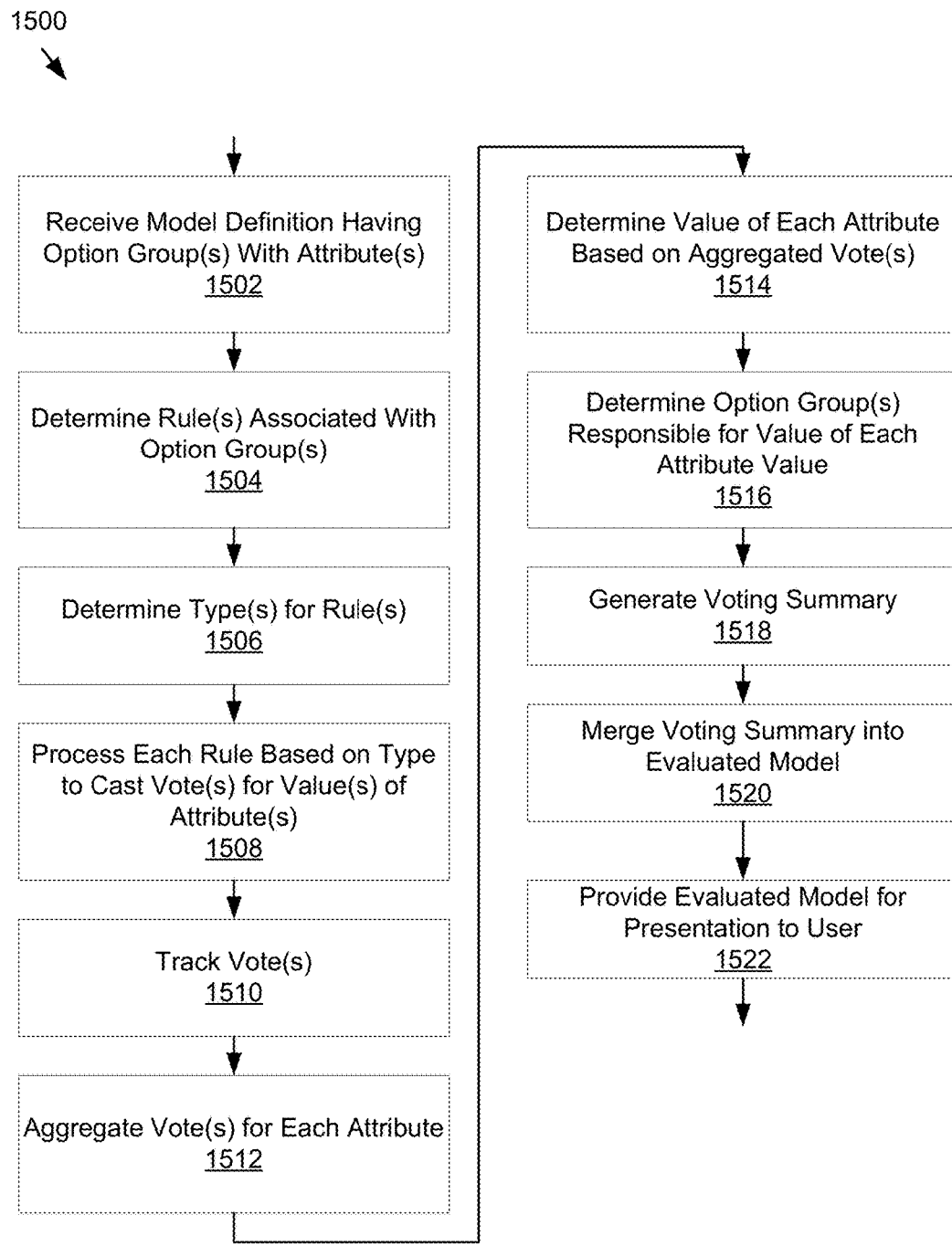
FIG. 15 is a flowchart of an example method for generating a voting summary, merging the voting summary into an evaluated model, and presenting the evaluated model to a user.

FIG. 15 is a flowchart of an example method for generating a voting summary, merging the voting summary into an evaluated model, and presenting the evaluated model to a user. The method 1500 may begin by receiving 1502 model definition having option group(s) with attribute(s). The method 1500 may determine 1504 rule(s) associated with option group(s). Each rule may have a corresponding rule type, and the method 1500 may determine 1506 the type of each rule. Next, the method 1500 may process 1508 each rule based on its type, and based on the processing, may cast votes for setting the value(s) of the attribute(s) associated with the rule. In some implementations, an attribute may be included in the rule or may be related to a dimension, variable, or function associated with the rule, such as an option, option group, etc. For example, in the rule, various option groups may be configured to vote for a particular attribute value.

The method 1500 may track 1510 vote(s) the votes that are cast and aggregate 1512 the votes for each attribute once voting is complete. Based on the aggregated votes, the method 1500 may determine 1514 the value of each attribute. In determining the attribute value(s), the method 1500 may determine 1516 option group(s) responsible for setting/voting for value(s) and use this information to generate 1518 a voting summary (e.g., object). The method 1500 may merge 1520 the voting summary into evaluated model and provide 1522 information describing the evaluated model, including the voting summary describing reasons for attribute values, for presentation to user.

In some implementations, the above-discussed operations with reference to method 1500 may be performed by the voting mechanism 842. For example, the voting mechanism 842 may receive a model definition including a rule having one or more option groups corresponding to an attribute, determine one or more votes cast by the rule for the attribute, resolve the one or more votes cast by the rule to assign a specific value to the attribute, and generate a voting summary describing reason for the value assigned to the attribute. Furthermore, it should also be noted that the voting mechanism 842 may further be configured to perform other steps and/or operations of the method 1500 including the operations 1502-1520.

It should be understood that the various implementations and examples described in this disclosure are provided by way of illustration and example and should not be considered limiting, and that other variations and combinations of these implementations are contemplated and within the scope of the present disclosure. Moreover, unless stated otherwise, the various different implementations described herein should not be considered as being mutually exclusive and can be integrated in various ways, or may be further divided into various discrete devices, components, and methods. For example, various operations of the method 1300, 1400, 1420, 1450, or 1500 may be expanded upon by operations included in one or more of these or other methods and processes, or by concatenating and/or substituting various blocks from these methods, all of which are encompassed by the present disclosure. Further, it should be understood that, in some instances, the methods 1300, 1400, 1420, 1450, or 1500 may be iterated more than one time to produce additional results. Additionally, the usage of the terms first, second, etc., in various places in this disclosure does not necessarily imply a specific order or rank, and is used in some cases to help the reader discern between various objects, items, elements, etc.

FIGS. 16A-B are user interfaces for rule creation in a model. In particular, interface 1600 in FIG. 16A includes a save button 1602 for saving a rule that is being created for a particular model, a name box 1606 for entering a name for the rule, a description box 1608 for entering the description for the rule, a pull-down menu 1610 for selecting a type for the rule that is being created, a box 1612 for indicating the number of models that the rule will be used in, and a rule detail interface 1614 for configuring the rule.

The rule detail interface 1614 includes a rule definition table 1618 for the user to set particular rule conditions and actions for the rule, and enter one or more rule expressions for those rule conditions and actions. As depicted, the rule definition table 1618 includes options groups 1620 ("OG: Ram Size") and 1622 ("OG: Computer Type") as rule dimensions and 1624 ("Option Groups to show/hide") representing the rule action. The rule definition table 1618 includes an expression of the rule collectively represented by reference numbers 1626, 1628, and 1630. In the rule action portion of the expression, a user can choose to show/hide the option groups as indicated by reference number 1632, and delete a particular option group as indicated by reference number 1638, and add one or more option groups as indicated by reference number 1640. Using the "add option group" link 1616 and "add a new row" link 1642, the user may add additional rule dimensions and expressions, respectively.

In FIG. 16B, the interface 1680 shows similar elements for entering name, description, rule type, etc., as described above with reference to FIG. 16A, as well as a rule detail UI 1650. The rule detail UI 1650 includes a rule definition table 1654 for the user to define conditions, actions, and expressions for a "must select" rule. In particular, the rule definition table 1654 includes options groups 1656 ("OG: Computer Type") and 1658 ("OG: OSMediaKitComponent") as rule condition dimensions and 1660 ("Option to be added automatically") as a rule action. The rule definition table 1654 also includes a corresponding expression collectively represented by reference numbers 1662, 1664, and 1666. In the rule action portion of the expression, a user can define the options groups to be added automatically using the add option button 1676 and delete already defined option groups using the delete button 1674. It should be understood that the above interfaces are provided by way of example and that numerous additional interfaces are contemplated and encompassed hereby.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:
1. A computer-implemented method comprising:
generating a rule definition graphical user interface including a rule definition table for entering one or more rule expressions, the rule definition graphical user interface including a user-selectable rule dimension element for adding one or more of a rule condition dimension and a rule action dimension to the rule definition table, and a user-selectable rule expression element for adding one or more rule expressions to the rule definition table;
providing the rule definition graphical user interface including the rule definition table for presentation to a user;
receiving, via the user-selectable rule dimension element of the rule definition graphical user interface, one or more inputs defining a rule condition and a rule action of a rule for a model, the rule action including automatically graying out certain options of the rule action that do not satisfy the rule condition in the rule definition graphical user interface;

updating the rule definition table of the rule definition graphical user interface to add one or more columns reflecting the rule condition defined by the one or more inputs;
updating the rule definition table of the rule definition graphical user interface to add one or more columns reflecting the rule action defined by the one or more inputs;
receiving, via the user-selectable rule expression element of the rule definition graphical user interface, one or more inputs defining a rule expression for the model;
updating the rule definition table of the rule definition graphical user interface with one or more rows to include the rule expression for the rule condition and the rule action reflected in the one or more columns added to the rule definition table, the one or more rule expressions being defined by the one or more inputs;
storing the rule definition table as the rule in a table-based format;
compiling the rule into a compiled rule that is executable during evaluation of the model; and
evaluating the model based on the compiled rule.

2. The computer-implemented method of claim 1, wherein the one or more rule expressions include one or more of a value, a variable, and a function for the one or more columns reflecting the rule condition and the rule action.

3. The computer-implemented method of claim 1, wherein the rule includes one or more of a product, an option group, and an attribute.

4. The computer-implemented method of claim 1, wherein the compiling the rule into the compiled rule includes compiling the rule into one or more JavaScript objects.

5. The computer-implemented method of claim 1, further comprising converting the rule definition table embodying the rule of the model into JSON formatted data, wherein compiling the rule includes compiling the JSON formatted data into one or more rule objects, the one or more rule objects including the compiled rule.

6. The computer-implemented method of claim 1, wherein compiling the rule into the compiled rule includes generating a number of corresponding compiled rules, where the number of compiled rules is filter dependent.

7. A computer-implemented method comprising:
providing a rule definition table for presentation to a user;
receiving one or more inputs defining a rule for a model using the rule definition table;
compiling the rule into a compiled rule that is executable during evaluation of the model; and
evaluating the model based on the compiled rule by:
    receiving an evaluate instruction instructing to evaluate the model;
    retrieving the model;
    determining external data reflecting one or more configuration requirements of the user;
    injecting the external data into the model;
    initializing a corresponding configuration session;
    instantiating an in-memory model;
    injecting model instance data into the in-memory model, the model instance data including the model injected with the external data reflecting the one or more configuration requirements of the user; and
    evaluating the model by processing the compiled rule associated with the model.

8. The computer-implemented method of claim 7, further comprising re-evaluating the model, wherein re-evaluating the model further includes:
receiving a re-evaluate instruction instructing to re-evaluate the model;
retrieving an instance of the model as previously evaluated;
receiving a user selection configuring a product based on the model;
merging the user selection with the model as previously evaluated into a merged model;
retrieving an in-memory model;
determining differences between the merged model and the in-memory model;
applying the differences to the in-memory model and marking the differences as modified; and
evaluating the model by processing the compiled rule associated with the model corresponding to the differences.

9. The computer-implemented method of claim 7, further comprising:
providing data describing the model as evaluated for presentation to the user.

10. A system comprising:
one or more processors;
a modeling engine, executable by the one or more processors, to:
    generate a rule definition graphical user interface including a rule definition table for entering one or more rule expressions, the rule definition graphical user interface including a user-selectable rule dimension element for adding one or more of a rule condition dimension and a rule action dimension to the rule definition table, and a user-selectable rule expression element for adding one or more rule expressions to the rule definition table;
    provide the rule definition graphical user interface including the rule definition table for presentation to a user;
    receive, via the user-selectable rule dimension element of the rule definition graphical user interface, one or more inputs defining a rule condition and a rule action of a rule for a model, the rule action including automatically graying out certain options of the rule action that do not satisfy the rule condition in the rule definition graphical user interface;
    update the rule definition table of the rule definition graphical user interface to add one or more columns reflecting the rule condition defined by the one or more inputs;
    update the rule definition table of the rule definition graphical user interface to add one or more columns reflecting the rule action defined by the one or more inputs;
    receive, via the user-selectable rule expression element of the rule definition graphical user interface, one or more inputs defining a rule expression for the model;
    update the rule definition table of the rule definition graphical user interface with one or more rows to include the rule expression for the rule condition and the rule action reflected in the one or more columns added to the rule definition table, the one or more rule expressions being defined by the one or more inputs; and
    store the rule definition table as the rule in a table-based format; and a configuration engine, executable by the one or more processors, to compile the rule into a compiled rule that is executable during evaluation of the model, and to evaluate the model based on the compiled rule.

11. The system of claim 10, wherein the one or more rule expressions includes one or more of values, variables, and functions for the one or more columns reflecting the rule condition and the rule action.

12. The system of claim 10, wherein the rule includes one or more of a product, an option group, and an attribute.

13. The system of claim 10, wherein the configuration engine is further executable to compile the rule into one or more JavaScript objects.

14. The system of claim 10, wherein the modeling engine is further executable to convert the rule definition table embodying the rule of the model into JSON formatted data and the configuration engine is further executable to compile the JSON formatted data into one or more rule objects, the one or more rule objects including the compiled rule.

15. A system comprising:
   one or more processors;
   a modeling engine, executable by the one or more processors, to provide a rule definition table for presentation to a user and to receive one or more inputs defining a rule for a model using the rule definition table; and
   a configuration engine, executable by the one or more processors, to compile the rule into a compiled rule that is executable during evaluation of the model, and to evaluate the model based on the compiled rule by:
      receiving an evaluate instruction instructing to evaluate the model;
      retrieving the model;
      determining external data reflecting one or more configuration requirements of the user;
      injecting the external data into the model;
      initializing a corresponding configuration session;
      instantiating an in-memory model;
      injecting model instance data into the in-memory model, the model instance data including the model injected with the external data reflecting the one or more configuration requirements of the user; and
      evaluating the model by processing the compiled rule associated with the model.

16. The system of claim 15, wherein the configuration engine is further executable to re-evaluate the model by at least:
   receiving a re-evaluate instruction instructing to re-evaluate the model;
   retrieving an instance of the model as previously evaluated;
   receiving a user selection configuring a product based on the model;
   merging the user selection with the model as previously evaluated into a merged model;
   retrieving an in-memory model;
   determining differences between the merged model and the in-memory model;
   applying the differences to the in-memory model and marking the differences as modified; and
   evaluating the model by processing one or more rules associated with the model corresponding to the differences.

17. The system of claim 15, wherein the modeling engine is further executable to provide data describing the model as evaluated for presentation to the user.

* * * * *